(12) United States Patent
Seo et al.

(10) Patent No.: US 9,645,305 B2
(45) Date of Patent: May 9, 2017

(54) BACKLIGHT UNIT

(71) Applicant: Samsung Display Co., Ltd., Yongin, Gyeonggi-Do (KR)

(72) Inventors: Jin Seo, Osan-si (KR); Dong Hoon Kim, Suwon-si (KR); Seul Gi Kim, Seoul (KR); Dong Hyeon Lee, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 0 days.

(21) Appl. No.: 14/309,593

(22) Filed: Jun. 19, 2014

(65) Prior Publication Data

US 2015/0219821 A1 Aug. 6, 2015

(30) Foreign Application Priority Data

Feb. 6, 2014 (KR) .................. 10-2014-0013724

(51) Int. Cl.
*H01L 29/06* (2006.01)
*F21V 8/00* (2006.01)

(52) U.S. Cl.
CPC ......... *G02B 6/0088* (2013.01); *G02B 6/0023* (2013.01); *G02B 6/0091* (2013.01)

(58) Field of Classification Search
CPC .............. G02B 6/0026; G02B 6/0068; G02F 1/133615; G02F 2001/133317; G02F 2001/133614
USPC .............. 257/14, 98, 88, 13; 349/62, 65, 71; 362/611, 555, 606–608
See application file for complete search history.

(56) References Cited

U.S. PATENT DOCUMENTS

| 6,847,417 | B2 * | 1/2005 | Kim | G02B 6/0088 349/58 |
| 7,710,514 | B2 * | 5/2010 | Choi | G02B 6/0088 349/58 |
| 2002/0172039 | A1 * | 11/2002 | Inditsky | G02B 6/0021 362/231 |
| 2008/0297687 | A1 * | 12/2008 | Watanabe | G02B 6/0021 349/58 |
| 2012/0257414 | A1 * | 10/2012 | Park | G02B 6/0068 362/611 |
| 2013/0050612 | A1 | 2/2013 | Hur et al. | |
| 2013/0050616 | A1 | 2/2013 | Seo et al. | |

(Continued)

FOREIGN PATENT DOCUMENTS

KR 10-2012-0060540 A 6/2012
KR 10-2012-0113563 A 10/2012

(Continued)

*Primary Examiner* — Mohammed Shamsuzzaman
(74) *Attorney, Agent, or Firm* — Innovation Counsel LLP

(57) ABSTRACT

A backlight unit includes a light source, a light guiding plate disposed on a side of the light source to guide light, a quantum dot bar disposed between the light source and the light guiding plate and spaced apart from the light source and the light guiding plate, the quantum dot bar for performing wavelength conversion of light, and a quantum dot bar receiving unit disposed on lower surfaces of the quantum dot bar and the light guiding plate, wherein the quantum dot bar is seated on the quantum dot bar receiving unit, and the light guiding plate is mounted on the quantum dot bar receiving unit, and wherein the quantum dot bar receiving unit and the light guiding plate are coupled to each other.

5 Claims, 27 Drawing Sheets

(56) References Cited

U.S. PATENT DOCUMENTS

| | | | |
|---|---|---|---|
| 2013/0271700 A1* | 10/2013 | Nakamura | G02B 6/0026 349/65 |
| 2013/0336003 A1* | 12/2013 | Yang | G02B 6/42 362/608 |
| 2015/0042924 A1* | 2/2015 | Su | G02B 6/0011 349/65 |
| 2015/0103291 A1* | 4/2015 | Li | G02B 6/0023 349/62 |

FOREIGN PATENT DOCUMENTS

| KR | 10-2013-0003826 A | 1/2013 |
|---|---|---|
| KR | 10-1251807 | 4/2013 |
| KR | 10-1273138 | 6/2013 |
| KR | 10-1273198 | 6/2013 |

\* cited by examiner

BACKLIGHT UNIT

CROSS-REFERENCE TO RELATED APPLICATION

This application claims priority from Korean Patent Application No. 10-2014-0013724 filed Feb. 6, 2014 in the Korean Intellectual Property Office, and all the benefits accruing therefrom under 35 U.S.C. 119, the entire contents of which are herein incorporated by reference.

BACKGROUND

1. Technical Field

The present inventive concept relates to a backlight unit.

2. Description of the Related Art

A liquid crystal display device plays an important role in information display technology. In a liquid crystal display device, a liquid crystal is typically disposed between two glass substrates including respectively an upper electrode and a lower electrode. Images are displayed on the liquid crystal display device by applying voltages to the upper and lower electrodes, and changing the arrangement and direction the liquid crystal molecules to transmit or reflect light.

Since the liquid crystal display device is a light receiving device and cannot emit light on its own, a a backlight unit is typically required for irradiating light to a display panel. Specifically, the liquid crystal display device displays an image by adjusting the transmittance of light incident from the backlight unit.

In recent years, a light emitting diode (LED) is commonly used as a light source of the backlight unit in the liquid crystal display device. The LED is a semiconductor light emitting device which emits light when a current flows. The LED is widely used as a backlight unit of a lighting apparatus, electric display board, and display device due to its superior characteristics (e.g., long lifespan, low power consumption, fast response speed, excellent initial drive characteristics, etc.). As a result, the LED has proliferated into many different fields and applications.

Quantum dots may be used to increase the color purity in an LED light source. The quantum dots emit light when excited electrons transit from a conduction band to a valence band, and the wavelength of the light varies according to the sizes of the quantum dots. Since light of a shorter wavelength is emitted when the size of the quantum dots is smaller, light having a desired wavelength region may be obtained by adjusting the size of the quantum dots.

Since the quantum dot material is mainly sealed in a sealing member (such as glass), the sealing member may be damaged due to external impact. Since the quantum dot material may contain a hazardous component such as Cr, environmental pollution may result if the quantum dot material leaks from the sealing member. Thus, studies have been conducted to prevent damage to the sealing member, so as to implement white light with high color reproducibility using the quantum dot material.

SUMMARY

The present disclosure addresses at least the above issues relating to damage to a sealing member containing quantum dot material.

According to an embodiment of the inventive concept, a backlight unit is provided. The backlight unit includes a light source, a light guiding plate disposed on a side of the light source to guide light, a quantum dot bar disposed between the light source and the light guiding plate and spaced apart from the light source and the light guiding plate, the quantum dot bar for performing wavelength conversion of light, and a quantum dot bar receiving unit disposed on lower surfaces of the quantum dot bar and the light guiding plate, wherein the quantum dot bar is seated on the quantum dot bar receiving unit, and the light guiding plate is mounted on the quantum dot bar receiving unit, and wherein the quantum dot bar receiving unit and the light guiding plate are coupled to each other.

In some embodiments, the quantum dot bar receiving unit may include a first protrusion protruding upward toward the light guiding plate, wherein the light guiding plate may include a first groove disposed corresponding to the first protrusion, and wherein the first protrusion may be inserted into and coupled with the first groove.

In some embodiments, the quantum dot bar receiving unit and the light guiding plate may be coupled to each other by an adhesive or an adhesive tape.

In some embodiments, the quantum dot bar receiving unit may include a first bent portion which is bent upward from a side surface on which the light source is disposed, wherein the first bent portion may include a first spacer protruding toward the quantum dot bar, and wherein the light source and the quantum dot bar may be spaced apart from each other by the first spacer.

In some embodiments, the first spacer may be made of an elastic member.

In some embodiments, the quantum dot bar receiving unit may include a guide groove to guide and receive the quantum dot bar.

In some embodiments, the backlight unit may further include a quantum dot bar cover disposed on an upper side of the quantum dot bar to cover the quantum dot bar.

In some embodiments, the quantum dot bar cover and the light guiding plate may be coupled to each other.

In some embodiments, the quantum dot bar cover may include a second protrusion protruding downward toward the light guiding plate, wherein the light guiding plate may include a second groove disposed corresponding to the second protrusion, and wherein the second protrusion may be inserted into and coupled with the second groove.

In some embodiments, the quantum dot bar cover may include a second bent portion which is bent downward from a side surface on which the light source is disposed, wherein the second bent portion may include a second spacer protruding toward the quantum dot bar, and wherein the light source and the quantum dot bar may be spaced apart from each other by the second spacer.

In some embodiments, the quantum dot bar cover may further include a cavity formed between the quantum dot bar cover and the quantum dot bar.

In some embodiments, the backlight unit may further include an adhesive member interposed between the quantum dot bar receiving unit and the quantum dot bar, wherein the quantum dot bar may be bonded to the quantum dot bar receiving unit by the adhesive member.

According to another embodiment of the inventive concept, a backlight unit is provided. The backlight unit includes a light source, a light guiding plate disposed on a side of the light source to guide light, a quantum dot bar disposed between the light source and the light guiding plate and spaced apart from the light source and the light guiding plate, the quantum dot bar for performing wavelength conversion of light, a lower light source spacing unit located on a lower surface of the light source so as to space apart the light source from the quantum dot bar, a quantum dot bar receiving unit disposed on lower surfaces of the quantum dot bar and the light guiding plate, wherein the quantum dot bar receiving unit is configured to seat the quantum dot bar and mount the light guiding plate, and a first connection member connecting the lower light source spacing unit to the quantum dot bar receiving unit, wherein the quantum dot bar receiving unit and the light guiding plate are coupled to each other, and wherein the quantum dot bar receiving unit is movable laterally on a plane with respect to the lower light source spacing unit.

In some embodiments, the first connection member may be an elastic member located between the lower light source spacing unit and the quantum dot bar receiving unit.

In some embodiments, the elastic member may be a spring.

In some embodiments, the first connection member may be formed by bolt coupling between the lower light source spacing unit and the quantum dot bar receiving unit, and wherein the lower light source spacing unit or the quantum dot bar receiving unit may include a first bolt rail formed by a groove extending in a direction in which the quantum dot bar receiving unit in a bolt-coupled portion moves.

In some embodiments, the backlight unit may further include a quantum dot bar cover disposed on an upper side of the quantum dot bar to cover the quantum dot bar, wherein the quantum dot bar cover and the light guiding plate may be coupled to each other.

In some embodiments, the backlight unit may further include an upper light source spacing unit located on an upper surface of the light source to space apart the light source from the quantum dot bar, and a second connection member connecting the upper light source spacing unit to the quantum dot bar cover, wherein the quantum dot bar cover may be movable laterally on a plane with respect to the upper light source spacing unit.

In some embodiments, the second connection member may be an elastic member located between the upper light source spacing unit and the quantum dot bar cover.

In some embodiments, the second connection member may be formed by bolt coupling between the upper light source spacing unit and the quantum dot bar cover, and wherein the upper light source spacing unit or the quantum dot bar cover may include a second bolt rail formed by a groove extending in a direction in which the quantum dot bar cover in a bolt-coupled portion moves.

BRIEF DESCRIPTION OF THE DRAWINGS

The above and other aspects and features of the inventive concept will be more apparent when the following exemplary embodiments are described with reference to the attached drawings.

DETAILED DESCRIPTION

Figure 1:
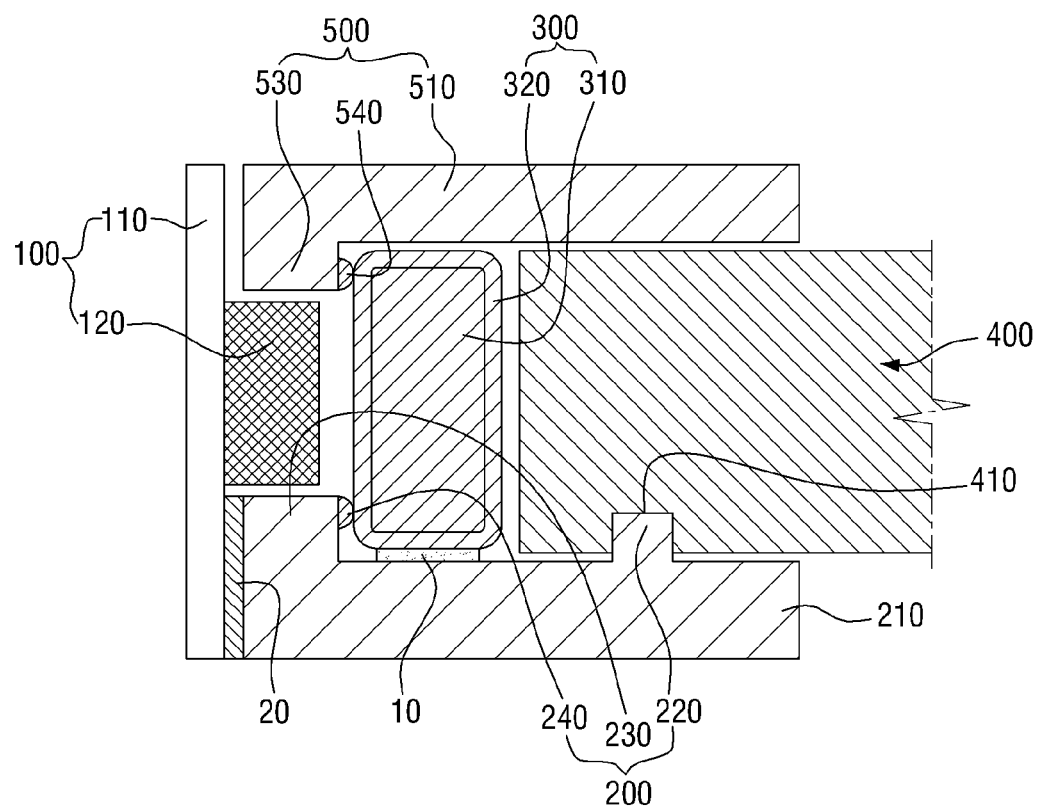
FIG. 1 is a cross-sectional view of a backlight unit according to an embodiment of the inventive concept.

The inventive concept will be described more fully herein with reference to the accompanying drawings, in which exemplary embodiments of the inventive concept are shown. As those skilled in the art would realize, the described embodiments may be modified in various different ways without departing from the spirit or scope of the inventive concept.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element, or with one or more intervening elements being present. In contrast, when an element is referred to as being "directly on" another element, there are no intervening elements present.

Although the terms "first," "second," and so forth are used to describe different constituent elements, the constituent elements are not limited by those terms. Rather, those terms are used to distinguish one constituent element from another other constituent element. Accordingly, a first constituent element may be described as a second constituent element in a different embodiment.

Embodiments of the inventive concept will be described herein with reference to the attached drawings.

FIG. 1 is a cross-sectional view of a backlight unit according to an embodiment of the inventive concept.

Referring to FIG. 1, the backlight unit includes a light source 100, a light guiding plate 400 disposed on a side of the light source 100 to guide light, a quantum dot bar 300 disposed between the light source 100 and the light guiding plate 400, and a quantum dot bar receiving unit 200 disposed on the lower surfaces of the quantum dot bar 300 and the light guiding plate 400. The quantum dot bar 300 is seated on the quantum dot bar receiving unit 200, and is spaced apart from the light source 100 and the light guiding plate 400. The quantum dot bar 300 performs wavelength conversion of light. The light guiding plate 400 is mounted on the quantum dot bar receiving unit 200. The quantum dot bar receiving unit 200 and the light guiding plate 400 may be coupled to each other.

Accordingly, the light source 100, the quantum dot bar 300, and the light guiding plate 400 may be disposed spaced apart from one another on a horizontal plane. The light generated from the light source 100 may pass through the quantum dot bar 300 to be wavelength-converted into white light, and the white light is then incident on the side surface of the light guiding plate 400, so as to be directed to a display panel on the front.

The quantum dot bar 300 may be seated on an upper part of the quantum dot bar receiving unit 200. The light source 100 may be located on the left side of the quantum dot bar 300 such that the quantum dot bar 300 is spaced at a predetermined interval from the light source 100. A part of the light guiding plate 400 may be mounted on the quantum dot bar receiving unit 200 to be spaced at a predetermined interval from the quantum dot bar 300.

The quantum dot bar 300 may further include an adhesive member 10 interposed between the quantum dot bar receiving unit 200 and the quantum dot bar 300. The quantum dot bar 300 may be attached to the quantum dot bar receiving unit 200 by the adhesive member 10. The adhesive member 10 may be, for example, an adhesive, a double-sided adhesive, or the like. Accordingly, the quantum dot bar 300 may be bonded and fixed onto the quantum dot bar receiving unit 200 by the adhesive member 10.

The light guiding plate 400 and the quantum dot bar receiving unit 200 may be coupled to each other. Since the quantum dot bar 300 and the light guiding plate 400 are spaced apart from each other and coupled to the quantum dot bar receiving unit 200, when the light guiding plate 400 expands, the quantum dot bar receiving unit 200 may move by a length that varies according to the expansion. Thus, breakage of the quantum dot bar 300 due to contact between the light guiding plate 400 and the quantum dot bar 300 can be prevented.

The quantum dot bar receiving unit 200 may include a first protrusion 220 protruding upward toward the light guiding plate 400 to be coupled with the light guiding plate 400. Further, the light guiding plate 400 may include a first groove 410 disposed corresponding to the first protrusion 220, and the first protrusion 220 may be inserted into and coupled with the first groove 410. That is, the first groove 410 may be located on the lower surface of the light guiding plate 400 and formed as a concave groove extending toward the upper surface of the light guiding plate 400. The concave groove may have a shape corresponding to the first protrusion 220 formed on the quantum dot bar receiving unit 200. Thus, the first protrusion 220 may be coupled to the first groove 410.

In some embodiments, although not shown in the drawings, the quantum dot bar receiving unit 200 and the light guiding plate 400 may be bonded to each other by an adhesive, an adhesive tape, or the like. The quantum dot bar receiving unit 200 may comprise a surface 210 parallel to a direction in which the light source 100, the quantum dot bar 300, and the light guiding plate 400 extend. The adhesive or adhesive tape may be located on the surface 210 between the light guiding plate 400 and the quantum dot bar receiving unit 200.

The quantum dot bar receiving unit 200 may include a first bent portion 230 bent upward from the side surface on which the light source 100 is disposed. The quantum dot bar 300 and the light source 100 may be spaced apart from each other at a predetermined interval by the first bent portion 230. Further, the first bent portion 230 may further include a first spacer 240 protruding toward the quantum dot bar 300. The first spacer 240 may protect the quantum dot bar 300 from damage, by preventing contact between the quantum dot bar 300 and the light source 100 when the quantum dot bar 300 moves.

The first spacer 240 may be made of an elastic member (e.g., rubber, silicon resin, or the like), and may prevent the quantum dot bar 300 from contacting with the light source 100 when the quantum dot bar 300 moves. If the light source 100 is close to or in contact with the quantum dot bar 300, the efficiency of the quantum dot bar 300 may be reduced rapidly by the heat generated in the light source. Thus, when the light source 100 and the quantum dot bar 300 are spaced apart at a predetermined interval by the first spacer 240, it is possible to prevent the efficiency of the quantum dot bar 300 from being reduced due to heat degradation.

The light source 100 may include a circuit board 110 and an LED package 120 located on the circuit board 110. The LED package 120 may be coupled to the circuit board 110, for example, by being mounted on the circuit board 110. A plurality of LED packages 120 may be arranged extending in the direction of the quantum dot bar 300. The circuit board 110 may include a circuit pattern for applying an electrical signal to the LED package 120. The circuit pattern may be formed of a metal material having excellent electrical conductivity and thermal conductivity, for example, gold (Au), silver (Ag), copper (Cu), or the like.

The circuit board 110 may be a printed circuit board (PCB), and formed of an organic resin material such as epoxy, triazine, silicon and polyimide, or other organic resin materials. Further, the circuit board may be a flexible printed circuit board (FPCB) or a metal core printed circuit board (MCPCB).

The LED package 120 may include an LED chip, which emits light according to an electric signal applied from the circuit board 110. The LED chip may be sealed in a molding frame by a sealing material.

The LED package 120 may be a blue LED or ultraviolet (UV) LED. The light emitted from the LED package 120 may be converted into high-purity white light after passing through the quantum dot bar 300.

The light source 100 may be located in a lower chassis (not shown) for accommodating the backlight unit. The lower chassis may include a bottom portion and a plurality of sidewall portions, and the circuit board 110 of the light source 100 may be attached to the sidewall portions. The sidewall portions of the lower chassis may be coupled to the circuit board 110 of the light source 100 by an adhesion method (e.g., using a heat radiation tape, resin, polyurethane, or the like) applied on the rear surface of the circuit board 110 (i.e., between the sidewall portions and the rear surface of the circuit board).

The quantum dot bar 300 may be spaced apart from the side surface of the light source 100. As previously described, the quantum dot bar 300 performs wavelength conversion of light incident from the light source 100, so as to emit white light. The white light emitted from the quantum dot bar 300 may be incident on the side surface of the light guide plate and transmitted to the display panel on a viewer (front) side.

The quantum dot bar 300 performs wavelength conversion of light incident from the light source 100, so as to emit white light. The quantum dot bar 300 may include a quantum dot containing tube 320 made of a transparent polymer material or glass. A mixture of polymer material and a quantum dot material 310 may be filled and sealed in the quantum dot containing tube 320. The quantum dot material 310 emits light when excited electrons transit from a conduction band to a valence band, and the wavelength of the emitted light varies according to the sizes of the quantum dot material. Since light of a shorter wavelength is emitted when the particle size of the quantum dot material is smaller, light having a desired wavelength region may be obtained by adjusting the particle size of the quantum dot material.

In some embodiments, the quantum dot material 310 has a particle size of 10 nm or less. For example, the quantum dot material 310 may emit reddish light if the particle size ranges from 55 to 65 Å, emit greenish light if the particle size ranges from 40 to 50 Å, and emit bluish light if the particle size ranges from 20 to 35 Å. Further, the quantum dot material 310 emits yellow light if the particle size is in between that of the quantum dot material emitting red light and the quantum dot material emitting green light.

The quantum dot bar 300 may be formed by mixing three quantum dot materials emitting red light, blue light and green light, respectively, after receiving light in a UV wavelength range if the light source is a UV LED, and mixing two quantum dot materials emitting red light and green light, respectively, after receiving light in a blue wavelength range if the light source is a blue LED.

The quantum dot material 310 may include silicon (Si)-based nano crystals, Group II-VI-based compound semiconductor nano crystals, Group III-V-based compound semiconductor nano crystals, Group IV-VI-based compound semiconductor nano crystals, or any mixtures of the above.

The Group II-VI-based compound semiconductor nano crystals may include one or more selected from the following group: CdS, CdSe, CdTe, ZnS, ZnSe, ZnTe, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HggZnTe, CdZnSeS, CdZnSeTe, CdZnSTe, CdHgSeS, CdHgSeTe, CdHgSTe, HgZnSeS, HgZnSeTe, and HgZnSTe.

The Group III-V-based compound semiconductor nano crystals may include one or more selected from the following group: GaPAs, AlNP, AlNAs, AlPAs, InNP, InNAs, InPAs, GaAlNP, GaAlNAs, GaAlPAs, GaInNP, GaInNAs, GaInPAs, InAlNP, InAlNAs, and InAlPAs.

The Group IV-VI-based compound semiconductor nano crystals may include SbTe.

Although not shown in the drawings, the light guiding plate 400 may be disposed on the bottom surface of the lower chassis, and a part of the side surface of the light guiding plate 400 may be mounted on the quantum dot bar receiving unit 200 so as to be spaced at a predetermined interval from the quantum dot bar 300. Thus, the light emitted from the light source 100 may pass through the quantum dot bar 300 mounted on the quantum dot bar receiving unit 200, and white light emitted through the quantum dot bar 300 may be incident on the side surface of the light guiding plate 400 to be directed to the display panel located on the upper surface of the light guiding plate 400.

The light guiding plate 400 changes the incident light into plane light by reflection, refraction and scattering, and then emits the plane light. The light guiding plate 400 may be formed of polymethyl methacrylate resin, polycarbonate resin, acrylonitrile-styrene-butadiene copolymer resin, polystyrene resin, acrylonitrile-styrene copolymer resin, polyolefin resin, polymethacrylic-styrene resin obtained by mixing polymethyl methacrylate with polystyrene, or the like. The shape of the light guiding plate may be a wedge shape having a thickness that decreases as the distance from the light source increases, or a plate shape in which upper and lower surfaces are parallel. It should be noted that the shape of the light guiding plate may be modified in different ways by those skilled in the art.

Although not shown in the drawings, the bottom surface of the lower chassis (on which the light guiding plate is seated) may include a seating portion protruding toward the light guiding plate in order to seat the light guiding plate 400. The seating portion may have a protruding height such that the light guiding plate 400 can be positioned on the same parallel line as the light source 100 and the quantum dot bar 300. The light guiding plate 400 may be seated in a stable position by the quantum dot bar receiving unit 200 and the seating portion.

In some embodiments, as previously described, the first groove 410 (disposed corresponding to the first protrusion 220 formed on the quantum dot bar receiving unit 200) may be formed on the surface of the light guiding plate 400 where the light guiding plate 400 is mounted on the quantum dot bar receiving unit 200. By providing the first groove 410, when the light guiding plate 400 moves or expands, the quantum dot bar receiving unit 200 may also move in the same way (or amount).

The quantum dot bar 300 is formed by filling the quantum dot material 310 in the quantum dot containing tube 320. However, since the quantum dot containing tube 320 is made of a material such as glass and has a long tube shape, the quantum dot bar 300 has a fragile structure. In some instances, the material forming the quantum dots may include an environmental pollutant such as Cd. Thus, if the quantum dot bar 300 is broken, problems may occur in the product and/or environmental pollution may result.

The light guiding plate 400 may expand due to external heat or heat generated internally while being driven. If the light guiding plate 400 expands, the light guiding plate 400 may contact with the quantum dot bar 300 so as to cause damage to the quantum dot containing tube 320. The quantum dot bar 300 and the light guiding plate 400 are coupled to the quantum dot bar receiving unit 200 so as to move integrally with the quantum dot bar receiving unit 200. Accordingly, even though the light guiding plate 400 may expand, the quantum dot bar receiving unit 200 and the quantum dot bar 300 may move in the same amount as the expansion of the light guiding plate 400, thereby preventing the quantum dot bar 300 from being broken.

In some embodiments, a reflective sheet may be further provided on the rear surface of the light guiding plate 400 (i.e., between the light guiding plate 400 and the bottom surface of the lower chassis). The reflective sheet may reflect light emitted through the rear surface of the light guiding plate 400 toward the front surface of the light guiding plate 400, thereby increasing the efficiency of the emitted light.

The backlight unit according to the inventive concept may further include a quantum dot bar cover 500 located on the upper side of the quantum dot bar 300 to cover the quantum dot bar 300. The quantum dot bar cover 500 may prevent the quantum dot bar 300 from being damaged when other members are seated thereon. Further, the quantum dot bar receiving unit 200 and the quantum dot bar cover 500 may be made of a member that reflects light. Thus, light which is not directed toward the light guiding plate 400 between the quantum dot bar receiving unit 200 and the quantum dot bar cover 500 may be reflected toward the light guiding plate 400.

The quantum dot bar cover 500 may include a second bent portion 530 bent downward from the side surface on which the light source 100 is disposed. The quantum dot bar 300 may be spaced apart from the light source 100 by the second bent portion 530. Further, the second bent portion 530 may include a second spacer 540 protruding toward the quantum dot bar 300. The second spacer 540 may be made of the same material as the first spacer 240, and may be made of an elastic material, e.g., rubber, silicon resin, or the like. Accordingly, if the quantum dot bar 300 moves to the side surface of the light source 100, the second spacer 540 can separate the quantum dot bar 300 from the light source 100 by a predetermined interval, and prevent the quantum dot bar 300 from damage due to contact between the quantum dot bar 300 and the light source 100.

The circuit board 110 and the quantum dot bar receiving unit 200 may be bonded to each other by applying the adhesive member 20 (such as a double-sided tape or adhesive) on the contact surface.

Figure 2:
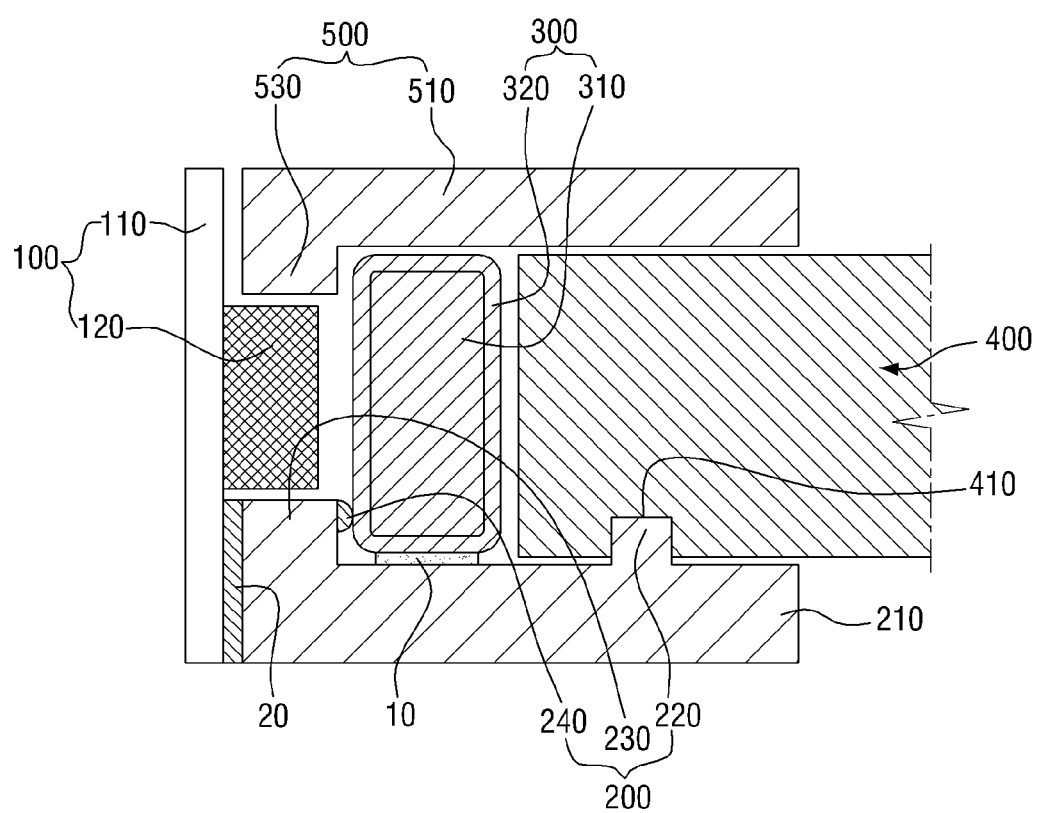
FIG. 2 is a cross-sectional view of a backlight unit according to another embodiment of the inventive concept.
Figure 3:
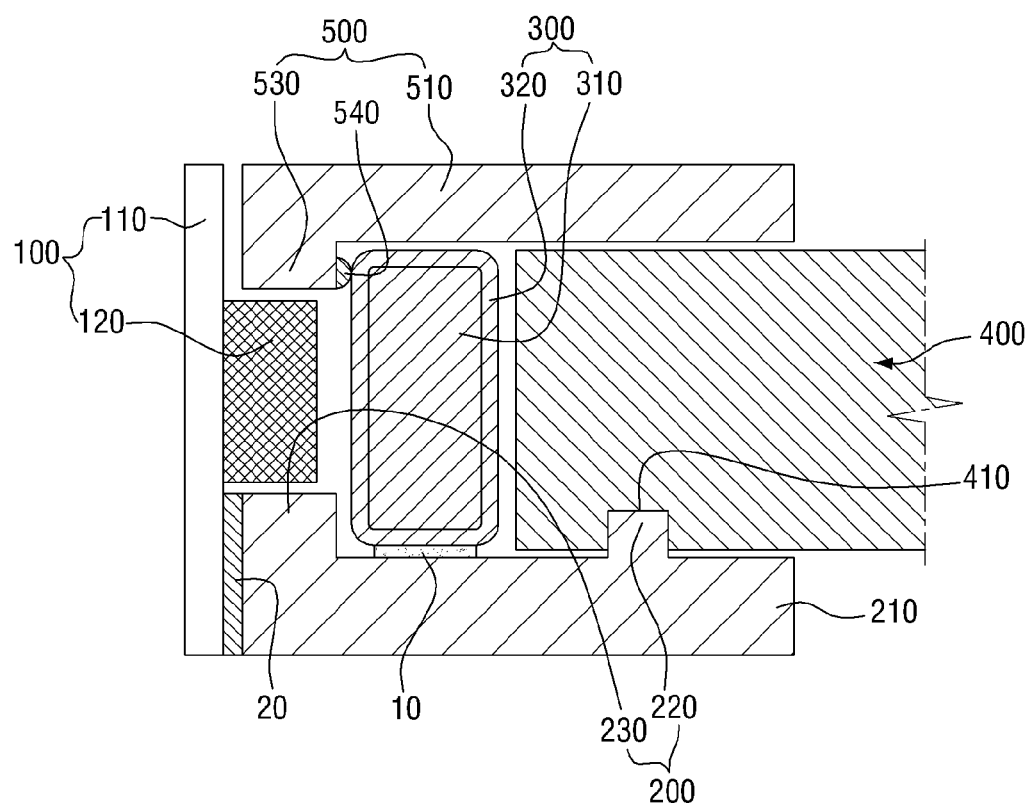
FIGS. 3 to 9 are cross-sectional views of a backlight unit according to yet another embodiment of the inventive concept.

Next, a backlight unit according to another embodiment of the inventive concept will be described with reference to FIGS. 2 and 3. As shown in FIG. 2, the quantum dot bar 300 may be spaced apart from the light source 100 by the first spacer 240 formed on the quantum dot bar receiving unit 200. In an alternative embodiment, as shown in FIG. 3, the first spacer 240 may be omitted and the quantum dot bar 300 may be spaced apart from the light source 100 by the second spacer 540. In some further embodiments, although not shown, both the first spacer 240 and the second spacer 540 may be omitted.

Figure 4:
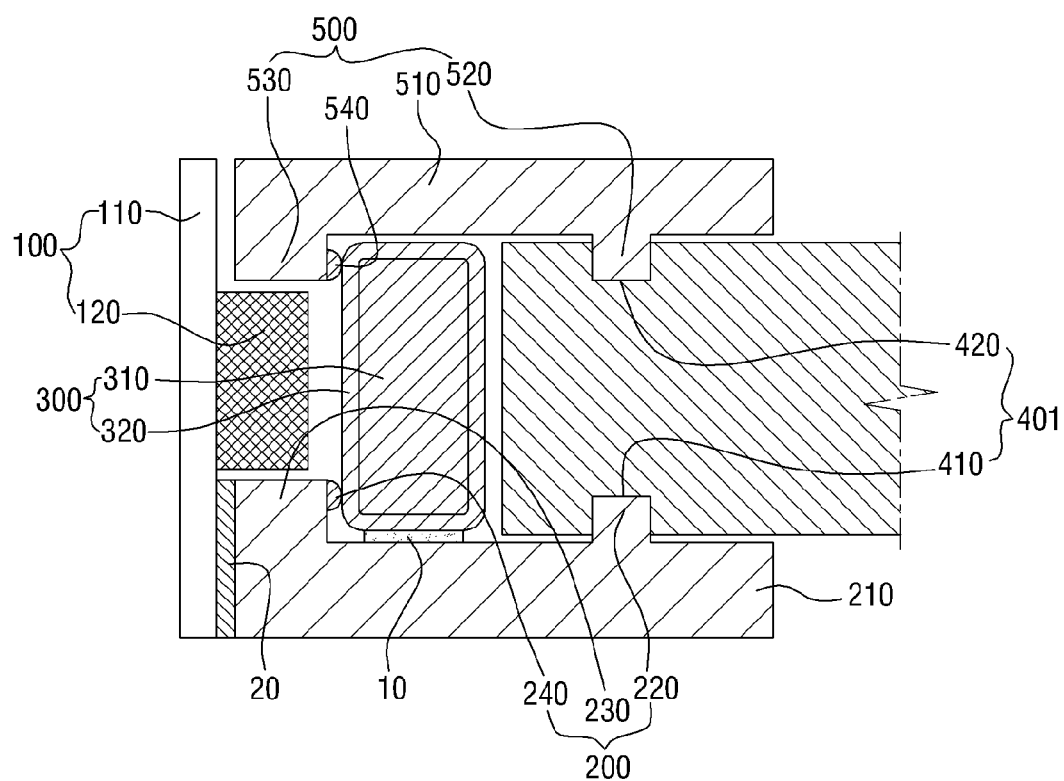

Referring to FIG. 4, the quantum dot bar cover 500 and the light guiding plate 400 may be coupled to each other. As shown in FIG. 4, the quantum dot bar cover 500 may include a second protrusion 520 protruding downward toward the light guiding plate 400, and the light guiding plate 400 may include a second groove 420 disposed corresponding to the second protrusion 520. Thus, the second protrusion 520 of the quantum dot bar cover 500 may be inserted into and coupled with the second groove 420 of the light guiding plate 400.

Since the quantum dot bar cover 500 and the light guiding plate 400 are coupled to each other, when the quantum dot bar receiving unit 200 coupled to the light guiding plate 400 moves due to expansion of the light guiding plate 400, the quantum dot bar cover 500 also moves in the same amount that the quantum dot bar receiving unit 200 moves. Thus, it is possible to maintain the spatial relationship between the aforementioned elements, such that the quantum dot bar 300 is located at a predetermined distance between the quantum dot bar cover 500 and the quantum dot bar receiving unit 200.

Figure 5:
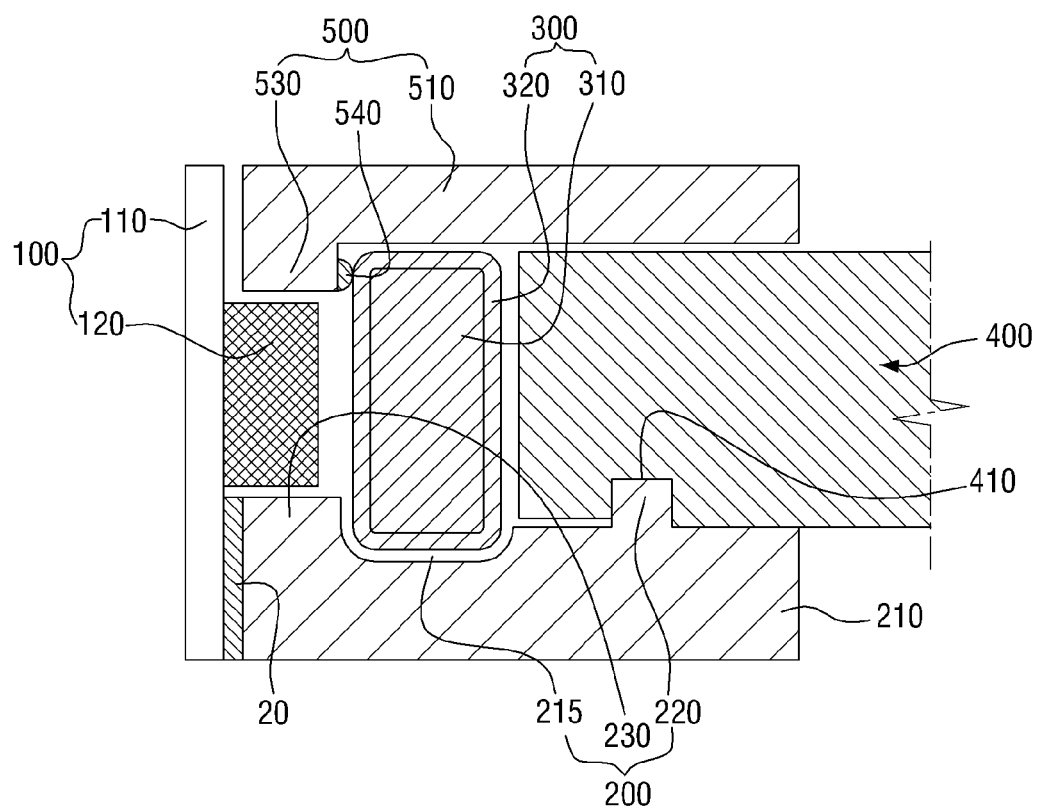

Referring to FIG. 5, in a backlight unit according to another embodiment of the inventive concept, the quantum dot bar receiving unit 200 may further include a guide groove 215 to guide and receive the quantum dot bar 300. The guide groove 215 may be formed in a shape corresponding to the shape of the lower portion of the quantum dot bar. That is, the guide groove 215 may be formed in a shape of the surface of the quantum dot bar 300 that is in contact with the quantum dot bar receiving unit 200, and the quantum dot bar 300 may be seated in a stable manner on the guide groove 215.

Figure 6:
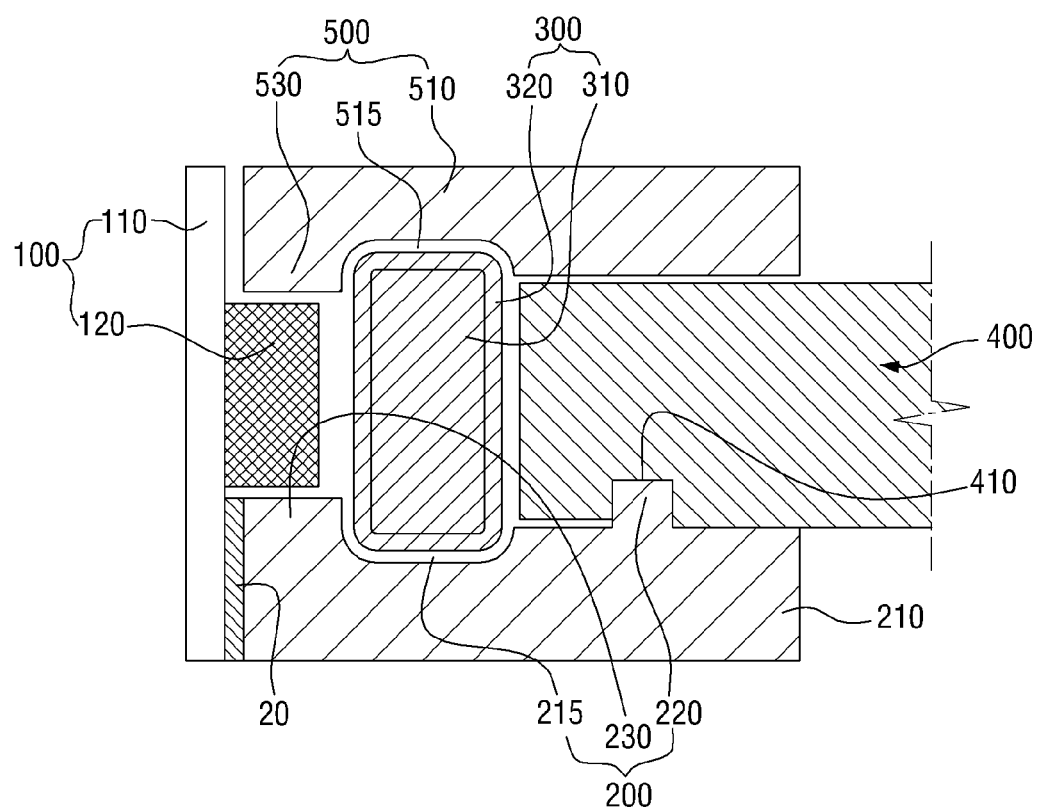

Referring to FIG. 6, in a backlight unit according to yet another embodiment of the inventive concept, a concave fixing groove 515 may be formed in the quantum dot bar cover 500 in a shape corresponding to the shape of the upper portion of the quantum dot bar 300. Accordingly, when the quantum dot bar cover 500 is closed, the quantum dot bar 300 may be fixed by the concave fixing groove 515. Further, since the quantum dot bar 300 is fixed and spaced apart from the light source 100 by the guide groove 215 and the concave fixing groove 515, the first spacer and the second spacer may be omitted.

Figure 7:
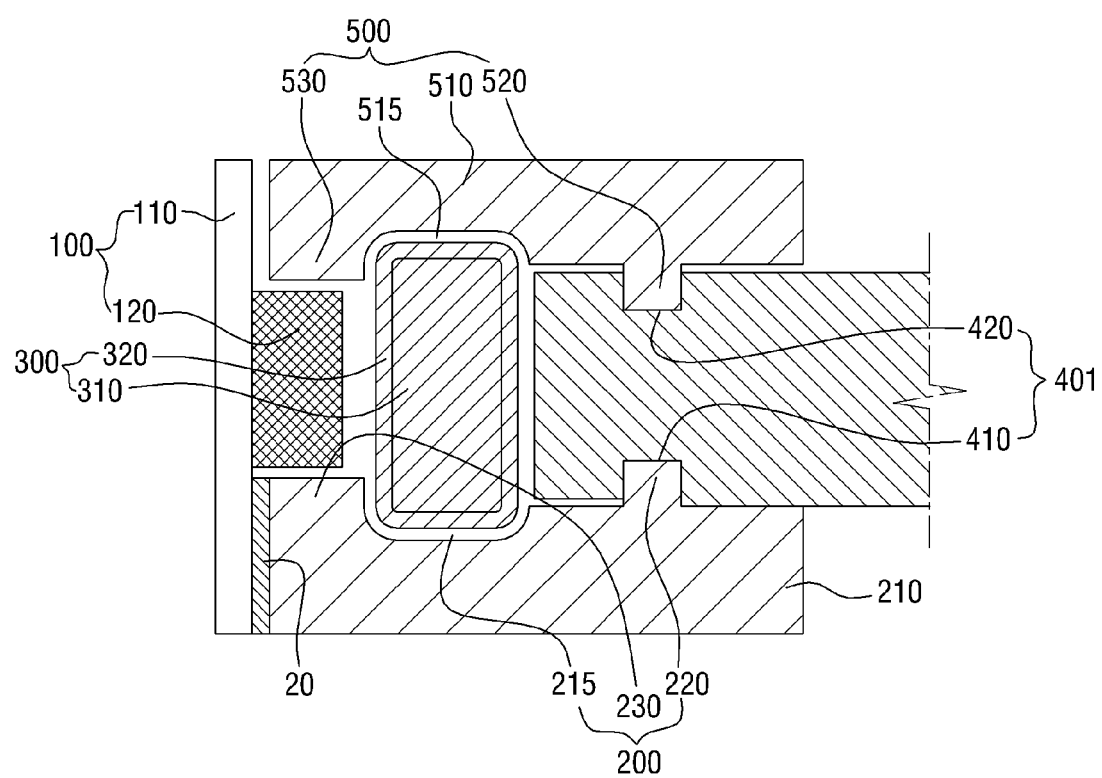

Referring to FIG. 7, according to yet another embodiment of the inventive concept, the second protrusion 520 may be further included in the quantum dot bar cover 500 in the backlight unit of FIG. 6. The light guiding plate 400 may further include the second groove 420 such that the quantum dot bar cover 500 and the light guiding plate 400 are coupled to each other.

Figure 8:
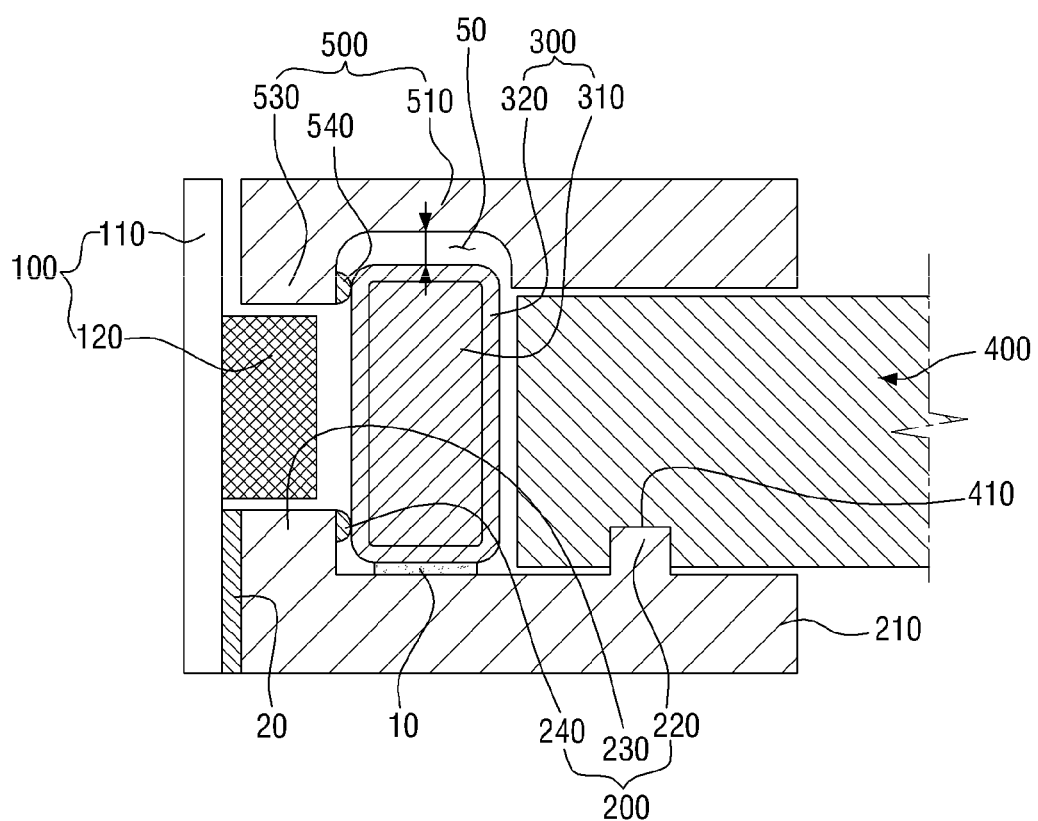

Referring to FIG. 8, in a backlight unit according to yet another embodiment of the inventive concept, the quantum dot bar cover 500 may further include a cavity 50 formed between the quantum dot bar cover 500 and the quantum dot bar 300. The cavity 50 may be formed as an empty space between the quantum dot bar cover 500 and the quantum dot bar 300, and may be an empty space extending toward the quantum dot bar cover 500 from the quantum dot bar 300. If the quantum dot bar cover 500 is closed, the cavity 50 may prevent the quantum dot bar 300 from being broken due to pressure exerted by the quantum dot bar cover 500.

Figure 9:
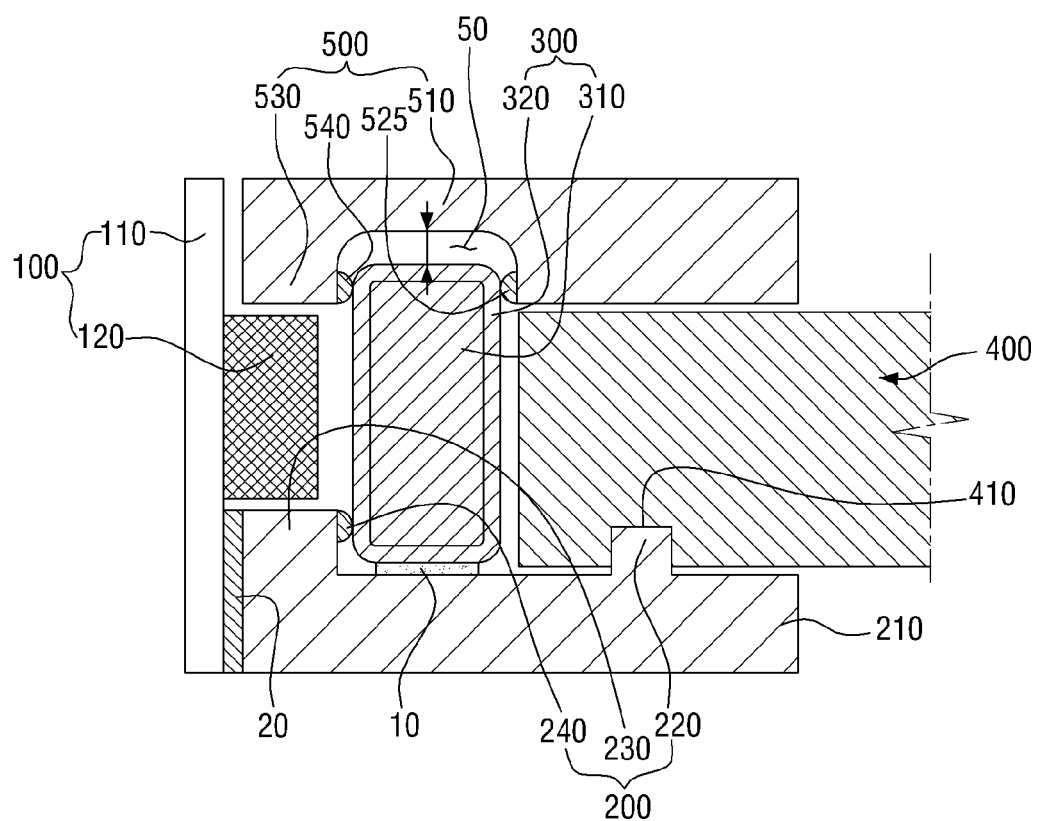

Referring to FIG. 9, in a backlight unit according to yet another embodiment of the inventive concept, a third spacer 525 may be further provided on the surface of the quantum dot bar cover 500, the third spacer 525 facing toward the quantum dot bar 300. The third spacer 525 may be made of the same material as the first spacer 240 and the second spacer 540. The third spacer 525 may prevent the quantum dot bar 300 from being damaged due to contraction of the quantum dot bar cover 500.

Figure 10:
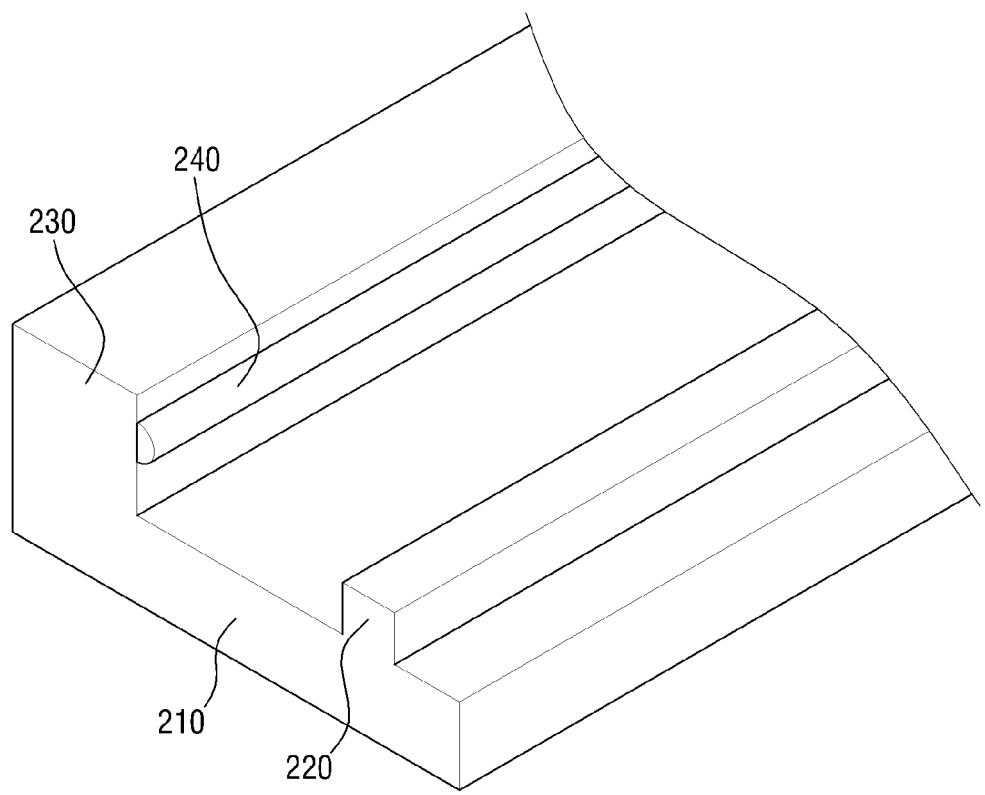
FIG. 10 is a perspective view of a quantum dot bar receiving unit according to an embodiment of the inventive concept.

Next, various embodiments of the quantum dot bar receiving unit 200 will be described with reference to FIGS. 10 to 14. As shown in FIG. 10, the quantum dot bar receiving unit 200 may have a surface 210 parallel to a direction in which the light source 100, the quantum dot bar 300, and the light guiding plate 400 extend. The surface 210 may include the first protrusion 220 protruding toward the light guiding plate 400. Further, the quantum dot bar receiving unit 200 may include the first bent portion 230 which is bent upward on the side (i.e., left side of the light source 100), and may include the first spacer 240 protruding toward the quantum dot bar 300 from the first bent portion 230. In this case, the first protrusion 220 may have a rectangular pillar shape extending in the longitudinal direction of the quantum dot bar 300. The first spacer 240 may have a semicircular cross-sectional shape and extend in the longitudinal direction of the quantum dot bar 300.

Figure 11:
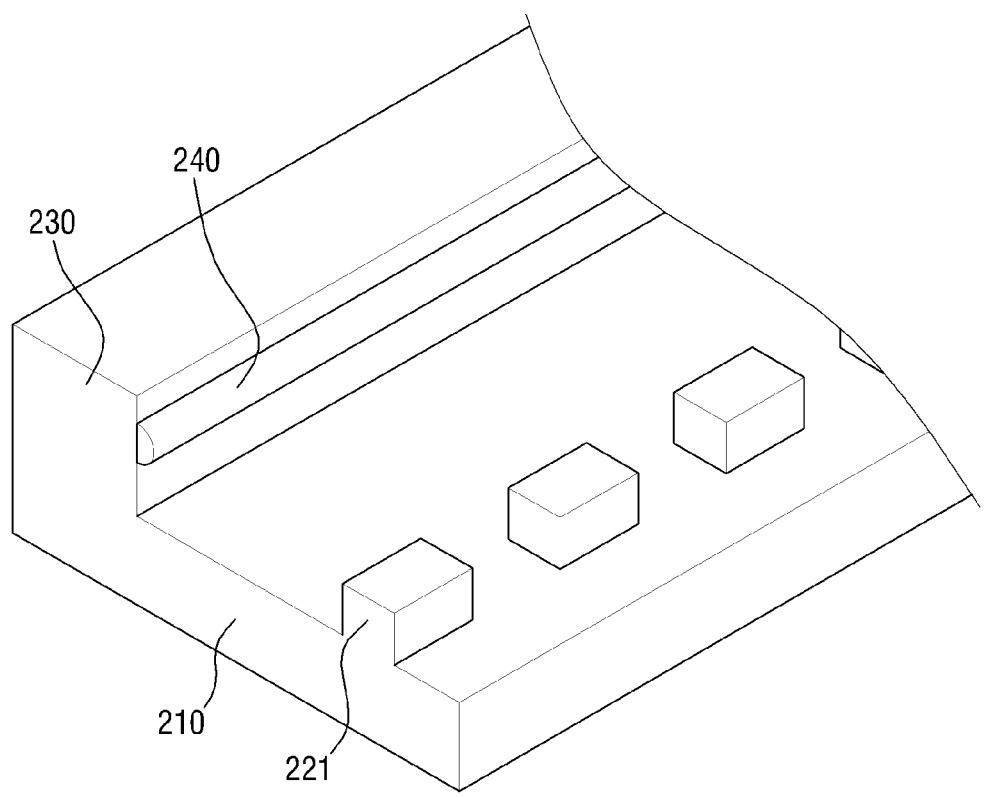
FIG. 11 is a perspective view of a quantum dot bar receiving unit according to another embodiment of the inventive concept.
Figure 12:
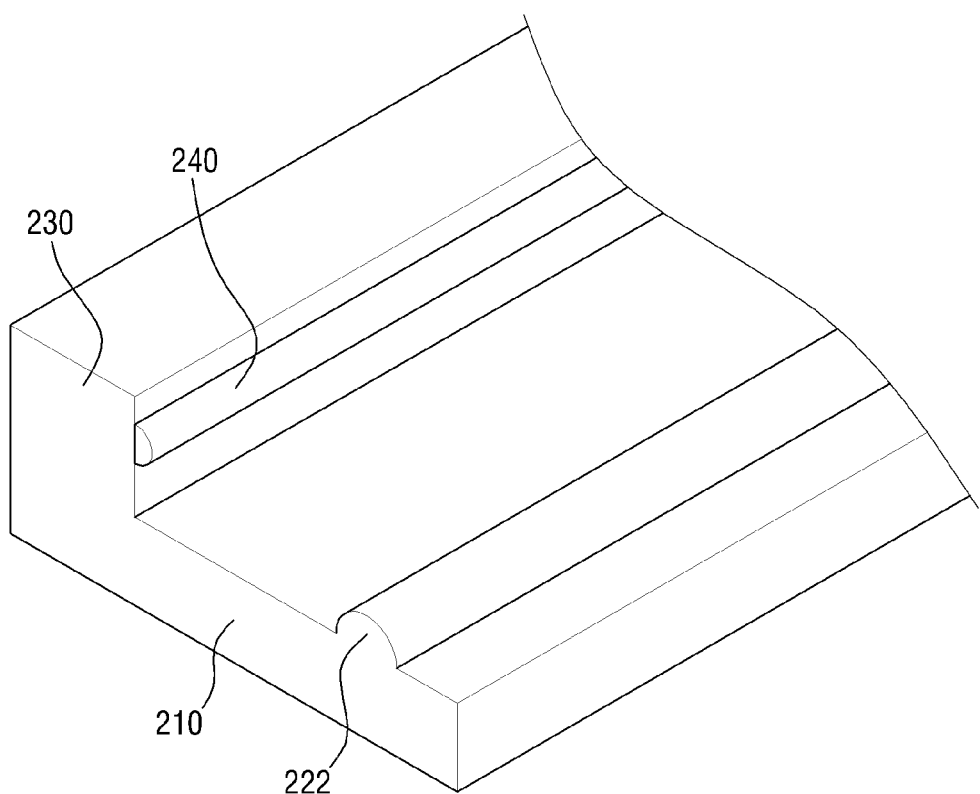
FIGS. 12 to 14 are perspective views of a quantum dot bar receiving unit according to yet another embodiment of the inventive concept.
Figure 13:
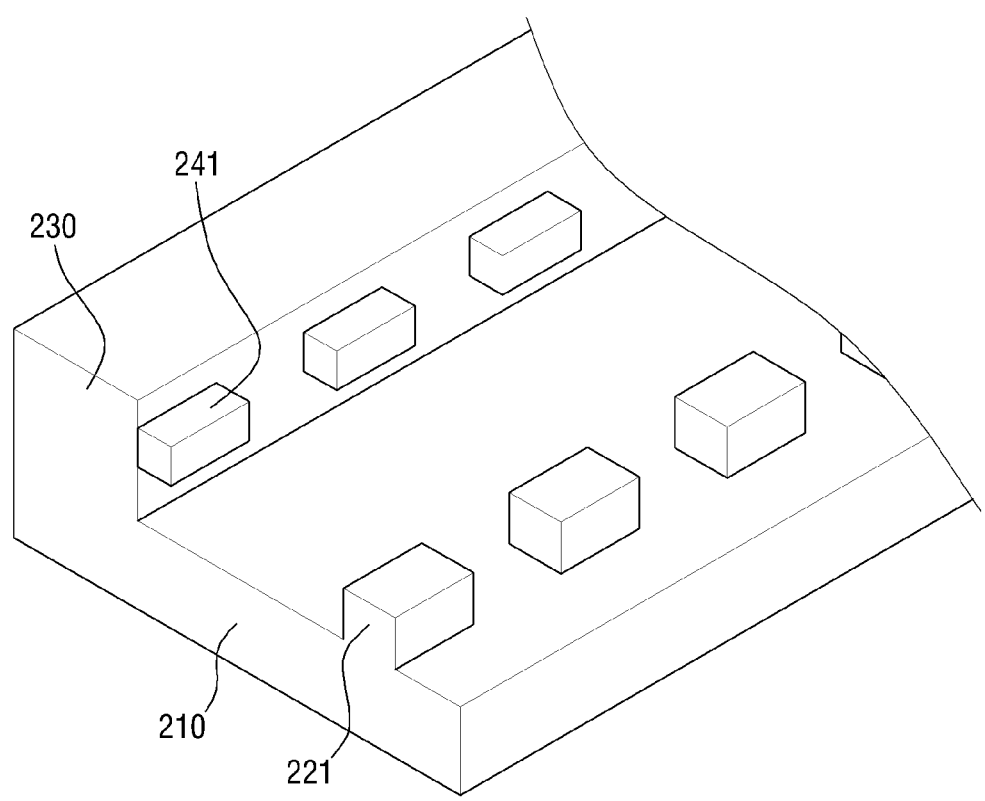
Figure 14:
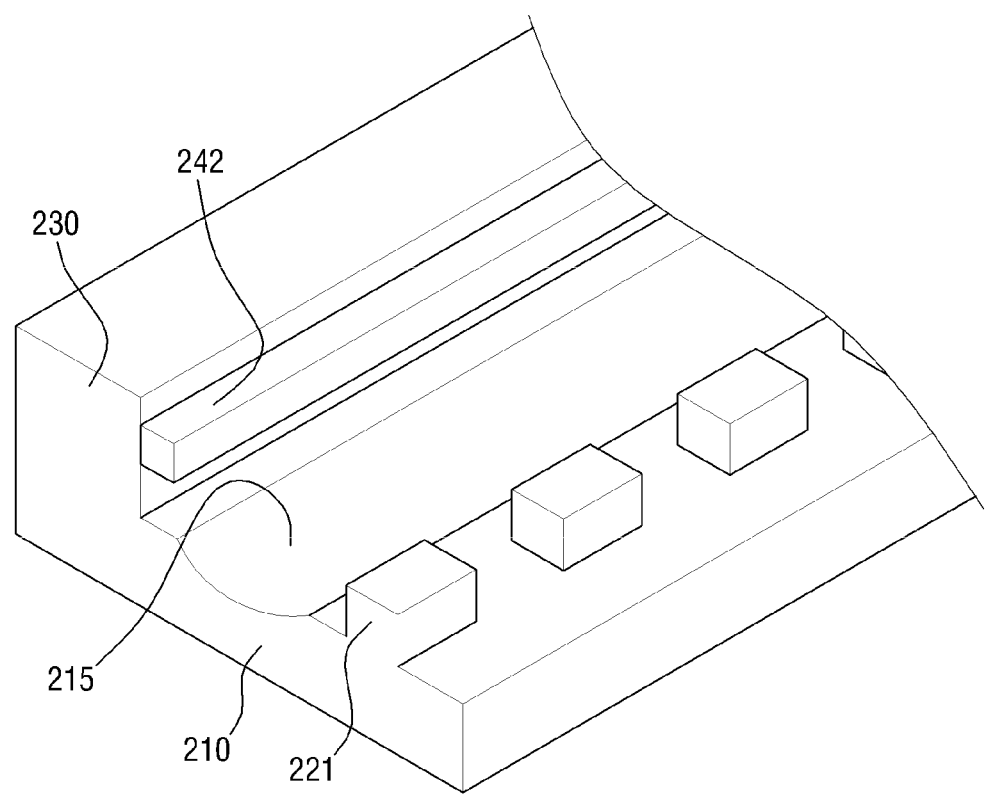

Referring to the quantum dot bar receiving unit of FIG. 11, first protrusions 221 may be spaced at regular intervals in the quantum dot bar receiving unit. Referring to the quantum dot bar receiving unit of FIG. 12, a first protrusion 222 may have a semicircular cross-sectional shape and extend in the longitudinal direction of the quantum dot bar 300 in the quantum dot bar receiving unit. Further, as shown in FIG. 13, first spacers 241 may have a rectangular pillar shape and are spaced at regular intervals in the quantum dot bar receiving unit. Further, as shown in FIG. 14, a first spacer 242 may be elongated in the direction in which the quantum dot bar 300 in the quantum dot bar receiving unit extends, and the quantum dot bar receiving unit may include a guide groove 215.

It should be noted that the various embodiments described above may be combined in different ways. As described above, the quantum dot bar receiving unit 200 may be coupled to the light guiding plate by an adhesive, adhesive tape, or the like applied on the flat surface 210, without forming the first protrusion.

Figure 15:
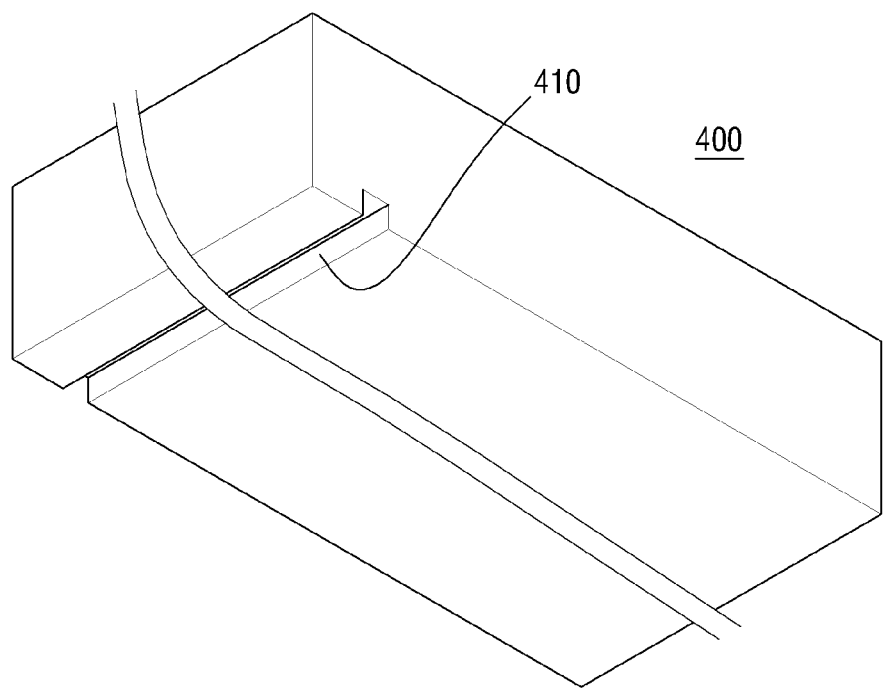
FIG. 15 is a perspective view of a light guiding plate according to an embodiment of the inventive concept.
Figure 16:
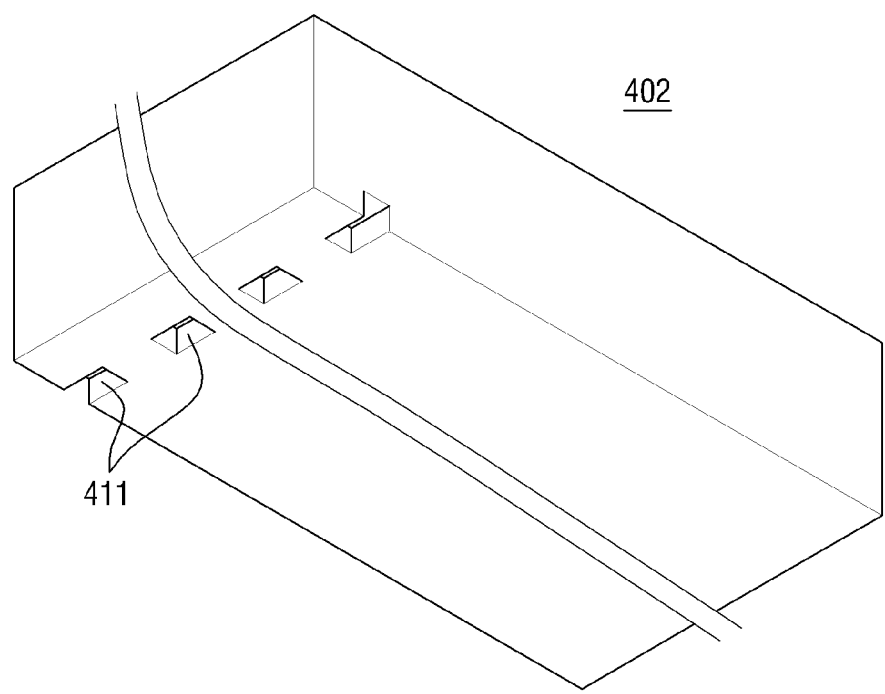
FIG. 16 is a perspective view of a light guiding plate according to another embodiment of the inventive concept.
Figure 17:
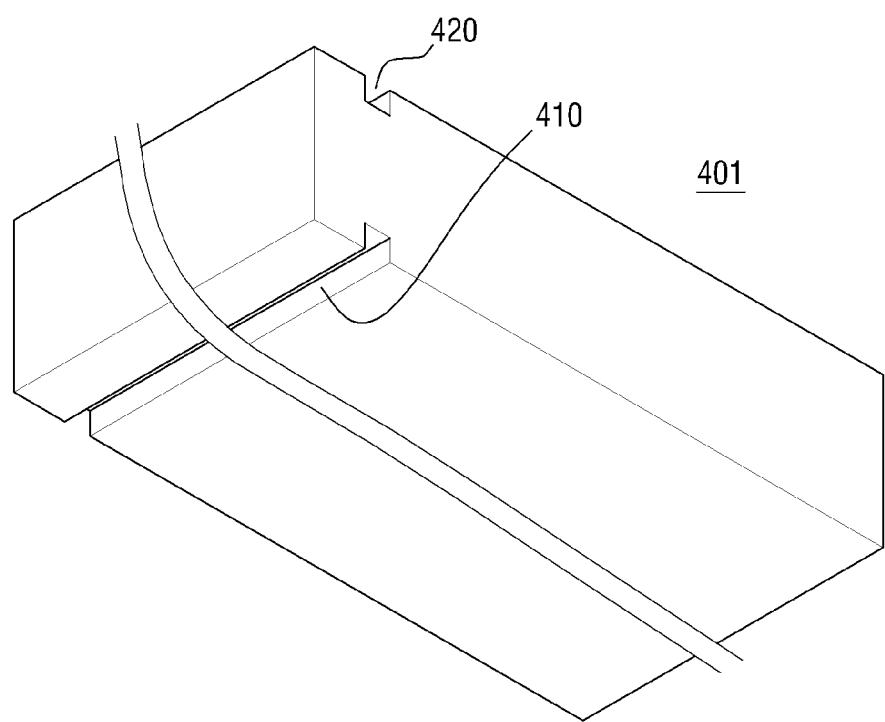
FIG. 17 is a perspective view of a light guiding plate according to yet another embodiment of the inventive concept.

FIGS. 15 to 17 show light guiding plates according to various embodiments of the inventive concept. FIG. 15 is a perspective view when the first groove 410 is formed in the light guiding plate 400 in a shape corresponding to the shape of the first protrusion 220 of the quantum dot bar receiving unit 200 shown in FIG. 10. FIG. 16 is a perspective view when first grooves 411 are formed in the light guiding plate 400 in a shape corresponding to the shape of the first protrusions 221 of the quantum dot bar receiving unit shown in FIG. 11. Further, FIG. 17 is a perspective view when the first groove 410 and the second groove 420 are formed in the upper and lower portions of the light guiding plate (in the embodiment in which the second protrusion 520 is formed in the quantum dot bar cover 500).

Although partially shown in the drawings, the light guiding plate according to the inventive concept may include the first groove(s) in the light guiding plate formed corresponding to the first protrusion(s) having various shapes. Also, the second groove(s) may be formed in the same way as the first groove(s). Further, a concave groove need not be formed in the light guiding plate, if an adhesive, adhesive tape, or the like is used to couple the light guiding plate with the quantum dot bar receiving unit or the quantum dot bar cover.

In some embodiments, the circuit board 110 and the quantum dot bar receiving unit 200 may be bonded to each other by applying the adhesive member 20 (such as a double-sided tape or adhesive) on the contact surface.

The quantum dot bar receiving unit 200 may be made of a member capable of reflecting light, and may be made of, for example, polycarbonate (PC) resin, a mixture of polycarbonate resin and acrylonitrile-butadiene-styrene copolymer resin, or a mixture of polycarbonate resin and glass fiber (G/F). Further, the quantum dot bar cover 500 may be made of the same material as the quantum dot bar receiving unit 200, and may have elasticity to fix the quantum dot bar 300.

Figure 18:
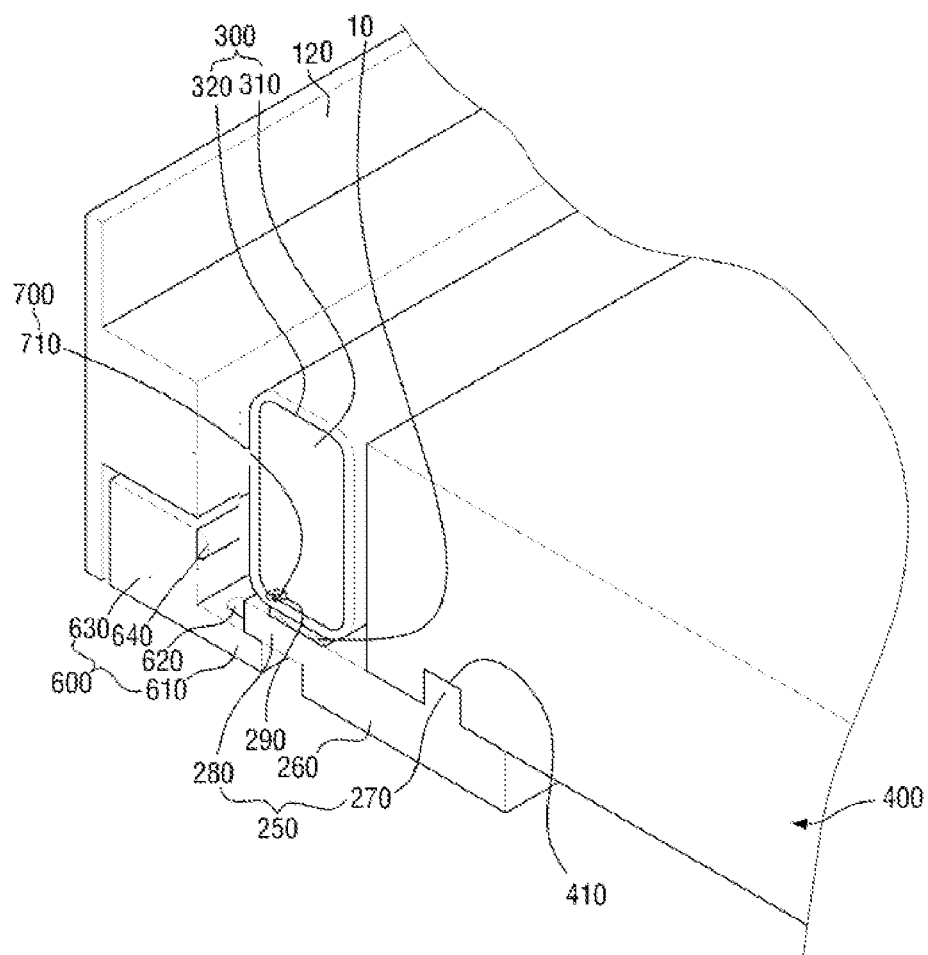
FIG. 18 is a perspective view of a backlight unit according to yet another embodiment of the inventive concept.
Figure 19:
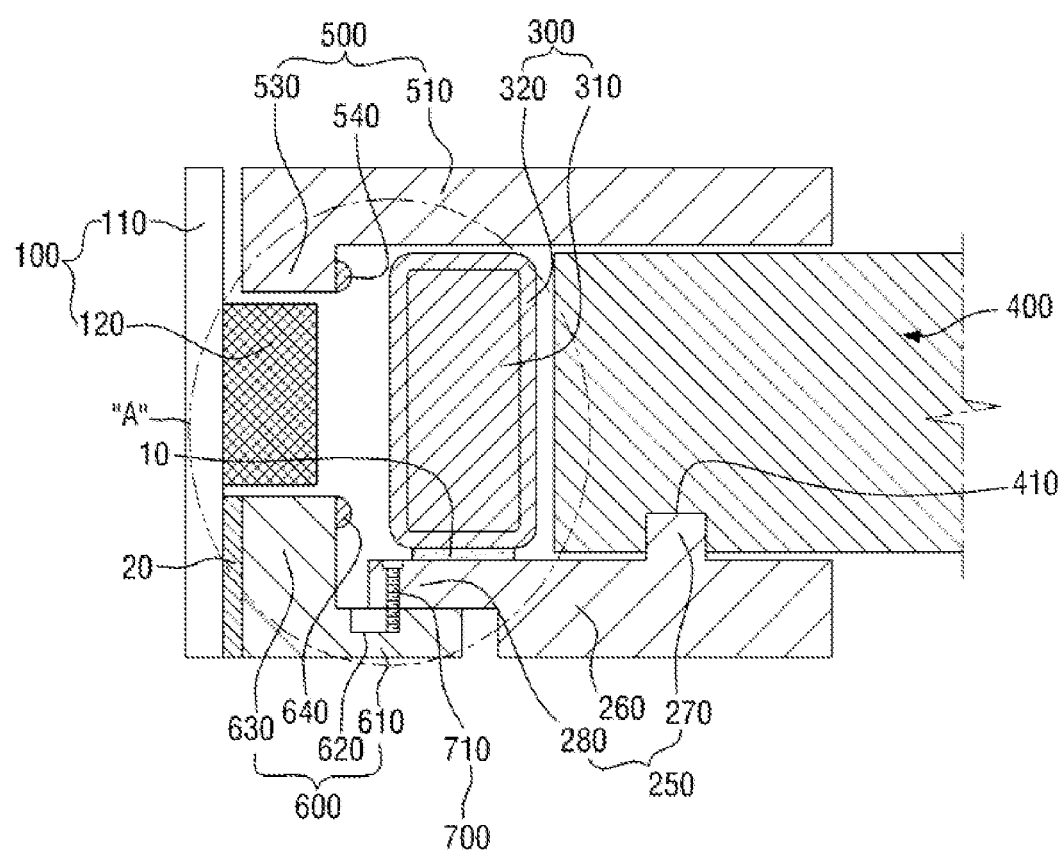
FIG. 19 is a cross-sectional view of the backlight unit of FIG. 18.

A backlight unit according to yet another embodiment of the inventive concept will be described with reference to FIGS. 18 and 19. FIG. 18 is a perspective view of the backlight unit, and FIG. 19 is a cross-sectional view of FIG. 18.

The backlight unit may include the light source 100, the light guiding plate 400 disposed on the side of the light source 100 to guide light, the quantum dot bar 300 disposed between the light source 100 and the light guiding plate 400 and spaced apart from the light source 100 and the light guiding plate 400, a lower light source spacing unit 600 located on the lower surface of the light source 100 to space apart the light source 100 from the quantum dot bar 300, a quantum dot bar receiving unit 250 disposed on the lower surfaces of the quantum dot bar 300 and the light guiding plate 400 to seat the quantum dot bar 300 and mount the light guiding plate 400 thereon, and a first connection member 700 which connects the lower light source spacing unit 600 to the quantum dot bar receiving unit 250. The quantum dot bar 300 performs wavelength conversion of light. The quantum dot bar receiving unit 250 and the light guiding plate 400 may be coupled to each other, and the quantum dot bar receiving unit 250 may be moved laterally on the plane with respect to the lower light source spacing unit 600.

As described above, the quantum dot bar receiving unit 250 and the light guiding plate 400 may be coupled to each other. Since the aforementioned elements and their configuration and functions have been described above, a detailed description thereof will be omitted.

The first connection member 700 may be a bolt 710. In this case, the lower light source spacing unit 600 and the quantum dot bar receiving unit 250 may be coupled to each other by the bolt 710. The lower light source spacing unit 600 or the quantum dot bar receiving unit 250 may include a first bolt rail 620 formed by a groove that is formed in a direction in which the quantum dot bar receiving unit 250 in a bolt-coupled portion moves. For example, FIG. 18 shows a case where the first bolt rail 620 is formed on the lower light source spacing unit 600, and the bolt 710 serving as the first connection member may be moved laterally on the first bolt rail 620.

That is, the first bolt rail 620 may be designed to have a width corresponding to the shape of the bolt to be coupled, and a cavity which is an empty space may be formed in the lateral direction of the bolt to allow the bolt to be moved laterally. Thus, the bolt 710 serving as the first connection member may be a connecting means to connect the lower light source spacing unit 600 to the quantum dot bar receiving unit 250, and may also be moved laterally on the first bolt rail 620. Accordingly, when the light guiding plate 400 expands or moves, the quantum dot bar receiving unit 250 may move laterally with respect to the lower light source spacing unit 600 while the lower light source spacing unit 600 is in a fixed state, thereby preventing the quantum dot bar 300 from breaking due to contact between the light guiding plate 400 and the quantum dot bar 300.

Figure 20:
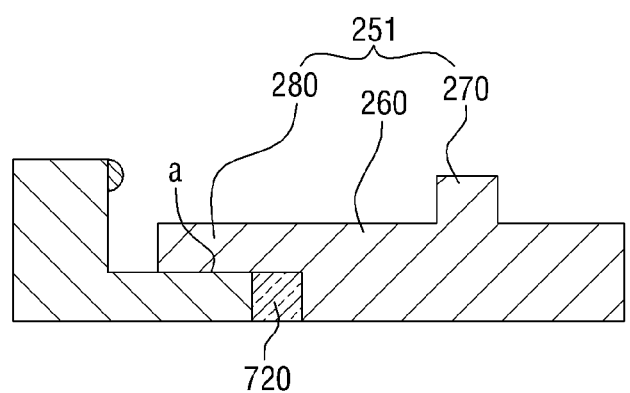
FIG. 20 is a cross-sectional view showing a coupling relationship between a lower light source spacing unit and a quantum dot bar receiving unit according to an embodiment of the inventive concept.
Figure 21:
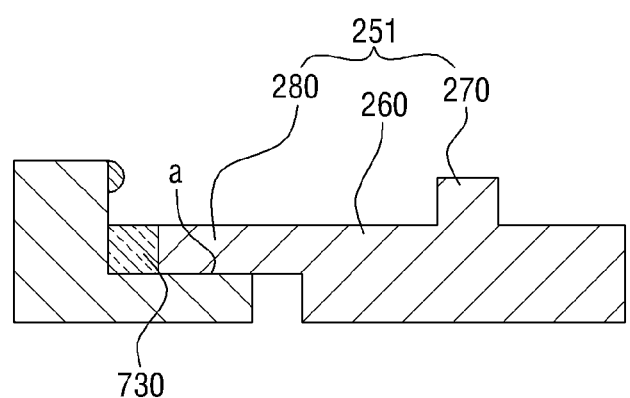
FIG. 21 is a cross-sectional view showing a coupling relationship between a lower light source spacing unit and a quantum dot bar receiving unit according to another embodiment of the inventive concept.
Figure 22:
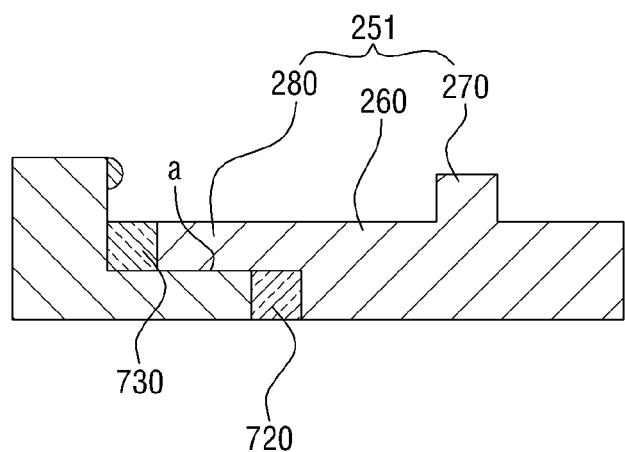
FIGS. 22 to 25 are cross-sectional views showing a coupling relationship between a lower light source spacing unit and a quantum dot bar receiving unit according to yet another embodiment of the inventive concept.

In some embodiments, the first connection member may be an elastic member located between the lower light source spacing unit 600 and the quantum dot bar receiving unit 250. FIGS. 20 to 22 show cross-sectional views of the backlight unit according to yet another embodiment of the inventive concept. As shown in FIGS. 20 to 22, a connection member made of an elastic member may be located between the lower light source spacing unit 600 and the quantum dot bar receiving unit 250 to connect them with each other. That is, the lower light source spacing unit 600 and the quantum dot bar receiving unit 250 may include upper and lower protruding surfaces, and may be spaced apart at predetermined intervals in the upper and lower portions.

In this case, as shown in FIG. 20, an elastic member 720 may be formed in the predetermined interval in the lower portion to enable lateral movement while connecting the quantum dot bar receiving unit 250 to the lower light source spacing unit 600. As shown in FIG. 21, an elastic member 730 may be formed in the predetermined interval in the upper portion to enable lateral movement while connecting the quantum dot bar receiving unit 250 to the lower light source spacing unit 600. Further, as shown in FIG. 22, the elastic members 720 and 730 are formed in both the predetermined intervals in the upper and lower portions to connect the quantum dot bar receiving unit 250 to the lower light source spacing unit 600.

In some embodiments, the elastic member may be made of a spring.

Figure 23:
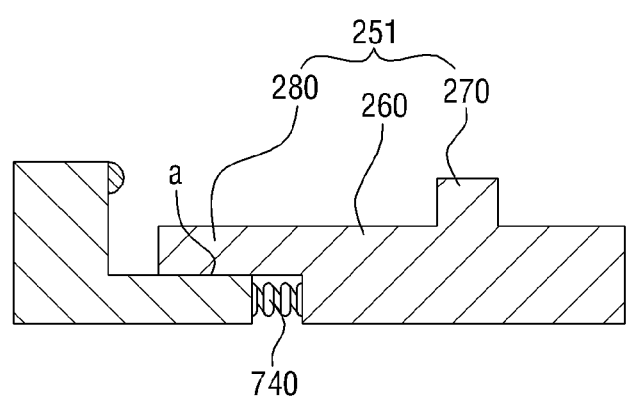
Figure 24:
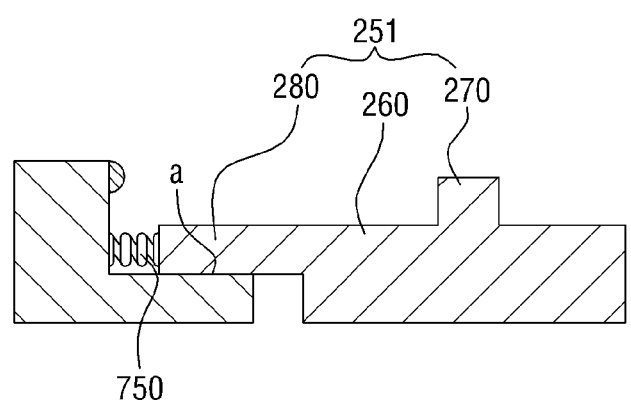

FIGS. 23 and 24 show an embodiment in which the elastic members are made of springs 740 and 750, respectively. The connection in the lower spaced portion may be made by using the spring 740 (shown in FIG. 23), and the connection in the upper spaced portion may be made by using the spring 750 (shown in FIG. 24) on the upper and lower protruding surfaces of the quantum dot bar receiving unit 250 and the lower light source spacing unit 600. Although not shown in the drawings, a connection may be made using the springs in both the spaced portions.

Figure 25:
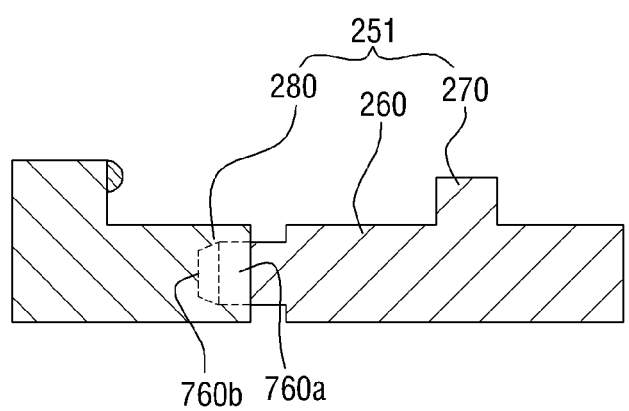

Next, the coupling between the lower light source spacing unit 600 and the quantum dot bar receiving unit 250 according to yet another embodiment of the inventive concept will be described with reference to FIG. 25. The lower light source spacing unit 600 may include a coupling groove 760*b* formed inward from the side surface facing the quantum dot bar receiving unit 250. The quantum dot bar receiving unit 250 may include a coupling protrusion 760*a* protruding from the side surface corresponding to the coupling groove 760*b*. In this case, the coupling protrusion 760*a* of the quantum dot bar receiving unit 250 may be coupled to the coupling groove 760*b* of the lower light source spacing unit 600 by the protrusion-groove engagement.

Further, the coupling groove 760*b* may have a shape where its width decreases toward the inside of the lower light source spacing unit 600, and the coupling protrusion 760*a* may be made of a member having elasticity. In this case, the coupling protrusion 760*a* cannot be fitted into the coupling groove 760*b* before a force equal to or greater than a predetermined force is applied. However, when a force equal to or greater than a predetermined force is applied, the coupling protrusion 760*a* may be fitted into the coupling groove 760*b* (since the coupling protrusion 760*a* is elastic) and may be moved laterally.

Meanwhile, in addition to the coupling relationship between the lower light source spacing unit 600 and the quantum dot bar receiving unit 250, other configurations may fall within the scope of the inventive concept so long as the lower light source spacing unit 600 and the quantum dot bar receiving unit 250 can be coupled to each other while being moved laterally.

Referring back to FIG. 19, the backlight unit may further include the quantum dot bar cover 500 covering the quantum dot bar 300 on the upper side of the quantum dot bar 300. Since the quantum dot bar cover 500 has been described above, a detailed description thereof will be omitted.

Figure 26:
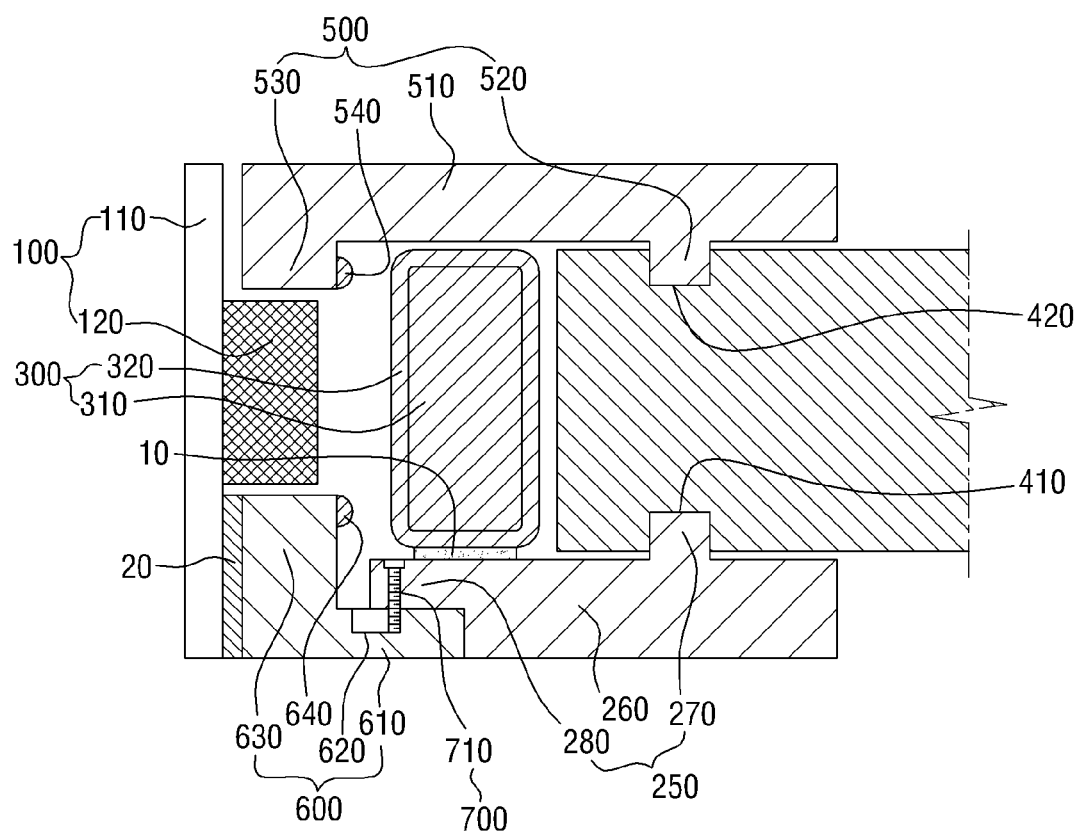
FIGS. 26 and 27 are cross-sectional views of a backlight unit according to yet another embodiment of the inventive concept.

Referring to FIG. 26, the quantum dot bar cover 500 and the light guiding plate 400 may be coupled to each other. In order to couple the quantum dot bar cover 500 with the light guiding plate 400, the quantum dot bar cover 500 may include the second protrusion 520 protruding downward toward the light guiding plate 400, and the light guiding plate 400 may include the second groove 420 disposed corresponding to the second protrusion 520. Accordingly, the second protrusion 520 of the quantum dot bar cover 500 may be inserted into and coupled to the second groove 420 of the light guiding plate 400. Since the coupling between the quantum dot bar cover 500 and the light guiding plate 400 has been described above, a detailed description thereof will be omitted.

Figure 27:
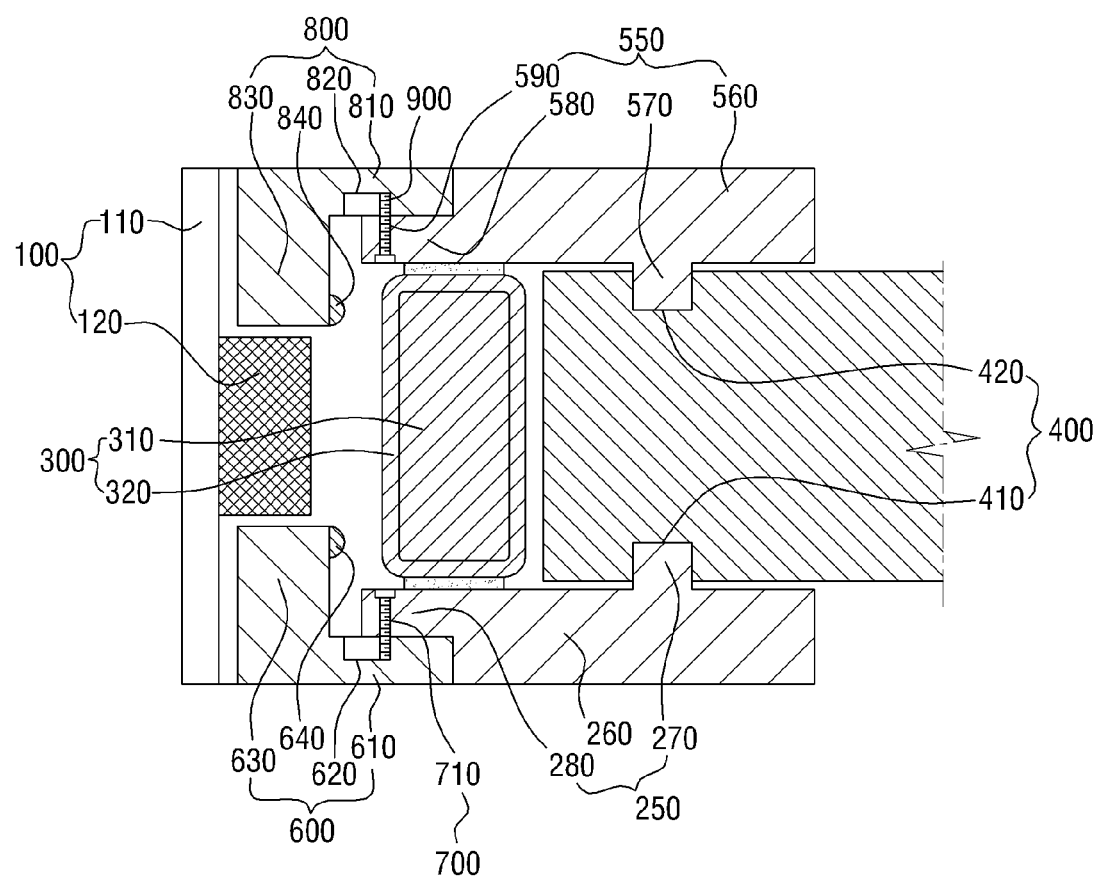

Referring to FIG. 27, a backlight unit according to yet another embodiment of the inventive concept may further include an upper light source spacing unit 800 located on the upper surface of the light source 100 to space apart the light source 100 from the quantum dot bar 300, and a second connection member 900 connecting the upper light source spacing unit 800 to a quantum dot bar cover 550. The quantum dot bar cover 550 may be moved laterally on the plane with respect to the upper light source spacing unit 800.

The second connection member 900 may be formed by bolt coupling between the upper light source spacing unit 800 and the quantum dot bar cover 550. The upper light source spacing unit 800 or the quantum dot bar cover 550 may further include a second bolt rail 820 formed by a groove extending in a direction in which the quantum dot bar cover 550 in a bolt-coupled portion moves.

Further, in addition to bolt coupling, the second connection member 900 may be an elastic member located between the upper light source spacing unit 800 and the quantum dot bar cover 550.

The quantum dot bar cover 550 may include a second protrusion 570 formed on the side of the light guiding plate 400, and may be coupled to the light guiding plate 400. When the light guiding plate 400 moves toward the quantum dot bar 300 due to expansion, since the quantum dot bar cover 550 may also be moved laterally by the second connection member 900, the quantum dot bar cover 550 may move in the same way as the light guiding plate 400. Thus, since the quantum dot bar cover 550 moves in the same way as the quantum dot bar receiving unit 250 is moved by the light guiding plate 400, the quantum dot bar 300 can be disposed in a stable manner at the upper and lower sides of the quantum dot bar 300.

Meanwhile, since various embodiments of the second connection member 900 are similar to those of the first connection member 700 described above, a detailed description thereof will be omitted.

The upper light source spacing unit 800 may include a surface 830 bent toward the light source 100, and a spacer 840 protruding toward the quantum dot bar 300 may be formed on the bent surface 830. Since the spacer 840 has the same configuration and function as those of the second spacer 540 described above, a detailed description thereof will be omitted.

Although not shown in the drawings, the backlight unit of the inventive concept may include a lower chassis capable of accommodating the light source 100, the quantum dot bar 300, the light guiding plate 400, the quantum dot bar receiving unit 200, and the quantum dot bar cover 500. The lower chassis may further include a bottom portion, a plurality of sidewall portions surrounding the bottom portion, and a seating portion protruding toward the side of the light guiding plate in order to seat the light guiding plate 400.

Further, in order to fix the quantum dot bar receiving unit 200 on the lower chassis, the lower surface of the quantum dot bar receiving unit may include a protrusion protruding toward the lower chassis. The protrusion may be coupled and fixed to a coupling hole formed on the lower chassis to receive the protrusion.

Further, the quantum dot bar receiving unit and the quantum dot bar cover may further include a fixing portion to fix the quantum dot bar cover such that the quantum dot bar cover is not opened while the quantum dot bar is accommodated therein. For example, the fixing portion may be a member such as a band having an empty space corresponding to the cross-sectional shape of the quantum dot bar cover, and the quantum dot bar receiving unit may be spaced at a predetermined interval in the upper and lower portions. In the aforementioned embodiments, a constant space can be maintained in the lateral direction such that the quantum dot bar receiving unit or the quantum dot bar cover can be moved laterally. In some embodiments, the fixing portion may be coupled to the quantum dot bar receiving unit and the quantum dot bar cover at both ends in the longitudinal direction so as to fix the quantum dot bar receiving unit and the quantum dot bar cover.

Further, in another embodiment of the inventive concept, the fixing portion may be formed in a cross-sectional shape including the lower light source spacing unit and the upper light source spacing unit.

Meanwhile, according to the inventive concept, a liquid crystal display device including the above-described backlight unit is provided. The backlight unit may be disposed on one sidewall portion of the lower chassis in the liquid crystal display device, or may be disposed on both sidewall portions facing each other. Further, if necessary, the backlight unit may be disposed on the adjacent sidewall portions, and thus the location of the backlight unit is not limited one particular embodiment.

According to an embodiment of the inventive concept, optical sheets such as a diffusion film, a prism film and/or a protection film may be stacked on the light guiding plate to improve the optical performance of the liquid crystal display device. The diffusion film may diffuse light emitted from the light guiding plate to supply the light to the display panel. The prism film may condense the light diffused from the diffusion film in a direction perpendicular to the plane of the upper display panel. In addition to the diffusion film and the prism film, a microlens array film, a lenticular lens film and the like may be used. For example, several optical sheets may be used to overlap each other. It should be noted that the above-described arrangement may be changed accordingly by those skilled in the art.

In some embodiments, an intermediate frame may be stacked on the optical sheet, and a display panel displaying an image may be seated thereon. Further, a top chassis including a window may be stacked on the display panel to cover a part of the display panel. The display panel may be configured such that a liquid crystal layer is interposed between TFT substrates. The display panel may include a color filter substrate, a polarizing filter, and a driving IC. An image can be displayed on the display panel by adjusting the intensity of light incident from the backlight unit.

A detailed description of the optical sheet and the display panel will be omitted since it is known to those skilled in the art.

According to the inventive concept, a backlight unit capable of implementing white light with high color reproducibility is provided.

The inventive concept also discloses a backlight unit having excellent durability, by preventing a quantum dot bar from being broken or damaged due to expansion of a light guiding plate, and by preventing the quantum dot bar from degrading due to heat from a light source.

However, the advantages of the inventive concept are not limited to those described above. The above and other advantages of the inventive concept will be more apparent to those of ordinary skill in the art with reference to the claims.

While the inventive concept has been illustrated and described with reference to various exemplary embodiments, it will be understood by those of ordinary skill in the art that the embodiments may be modified in different ways without departing from the spirit and scope of the present disclosure. Thus, the exemplary embodiments should be considered in a merely descriptive sense and do not limit the inventive concept.

What is claimed is:

1. A backlight unit comprising:
    a light source comprising a light package arranged on a circuit board, the circuit board extending in a longitudinal direction and the light package emitting light in a direction of emitted light that is perpendicular to the longitudinal direction;
    a light guiding plate disposed on a side of the light source to guide light emitted from the light source in the direction of emitted light toward an upper surface of the light guiding plate in a direction of guided light;
    a quantum dot bar disposed between the light source and the light guiding plate and spaced apart from the light source and the light guiding plate,
    a quantum dot bar receiving unit supporting the quantum dot bar and the light guiding plate and extending in the longitudinal direction,
    a quantum dot bar cover disposed on an upper side of the quantum dot bar to cover the quantum dot bar,
    wherein the quantum dot bar is seated on the quantum dot bar receiving unit,
    wherein the quantum dot bar receiving unit and the light guiding plate are coupled to each other and the quantum dot bar cover and the light guiding plate are coupled to each other, wherein the quantum dot bar receiving unit includes a first protrusion protruding in the direction of guided light and the quantum dot bar cover includes a second protrusion protruding downward toward the light guiding plate
    wherein the light guiding plate includes a first groove facing the first protrusion and recessed in the direction of guided light and the light guiding plate includes a second groove disposed corresponding to the second protrusion, and
    wherein the first protrusion is inserted into and coupled with the first groove and the second protrusion is inserted into and coupled with the second groove.

2. The backlight unit of claim 1, wherein the quantum dot bar receiving unit includes a first bent portion which is bent upward from a side surface on which the light source is disposed,
    wherein the first bent portion includes a first spacer protruding toward the quantum dot bar, and
    wherein the light source and the quantum dot bar are spaced apart from each other by the first spacer.

3. The backlight unit of claim 2, wherein the first spacer is made of an elastic member.

4. The backlight unit of claim 1, wherein the quantum dot bar cover includes a second bent portion which is bent downward from a side surface on which the light source is disposed,
    wherein the second bent portion includes a second spacer protruding toward the quantum dot bar, and
    wherein the light source and the quantum dot bar are spaced apart from each other by the second spacer.

5. The backlight unit of claim 1, further comprising an adhesive member interposed between the quantum dot bar receiving unit and the quantum dot bar,
    wherein the quantum dot bar is bonded to the quantum dot bar receiving unit by the adhesive member.

* * * * *